(12) United States Patent
Baba

(10) Patent No.: US 7,649,812 B2
(45) Date of Patent: Jan. 19, 2010

(54) TIME ADJUSTMENT DEVICE, TIMEPIECE WITH A TIME ADJUSTMENT DEVICE, AND A TIME ADJUSTMENT METHOD

(75) Inventor: Norimitsu Baba, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/260,893

(22) Filed: Oct. 29, 2008

(65) Prior Publication Data

US 2009/0129206 A1 May 21, 2009

(30) Foreign Application Priority Data

Nov. 21, 2007 (JP) ............................. 2007-302041
Jun. 12, 2008 (JP) ............................. 2008-154409

(51) Int. Cl.
  *G04C 11/02* (2006.01)
  *G01S 1/00* (2006.01)

(52) U.S. Cl. .................................. 368/47; 342/357.12

(58) Field of Classification Search .................. 368/10, 368/14, 46, 47; 342/357.06, 357.12; 701/213
See application file for complete search history.

(56) References Cited

U.S. PATENT DOCUMENTS 4,494,211 A   1/1985   Schwartz (Continued)

FOREIGN PATENT DOCUMENTS

EP   1 349 021 A2   10/2003

(Continued)

*Primary Examiner*—Vit W Miska

(57) ABSTRACT

A time adjustment device having a reception unit that receives satellite signals transmitted from positioning information satellites; a time information generating unit that generates internal time information; a time information adjustment component that corrects the internal time information; and a reception controller that controls operation of the reception unit; wherein the satellite signal contains satellite time information that is kept by the positioning information satellite; the reception unit can select a first reception mode for receiving first information including the hour, minute, and second data in the satellite signal, and a second reception mode for receiving second information including the hour, minute, and second data, week information for the current year, month, and day, and satellite health information in the satellite signal; the time information adjustment component includes a time adjustment recording component that records whether or not the time was adjusted using the second information received in the second reception mode after the internal time information was initialized, a first time information adjustment component that controls the reception unit by way of the reception controller in the first reception mode to receive the first information, and sets the hour, minute, and second values of the internal time information based on the received first information, and a second time information adjustment component that controls the reception unit in the second reception mode to receive the second information, and sets the year, month, day, hour, minute, and second values of the internal time information using the received second information; the first time information adjustment component operates when it is recorded in the time adjustment recording component that the time was adjusted using the second information; and the second time information adjustment component operates when it is not recorded in the time adjustment recording component that the time was adjusted using the second information.

13 Claims, 16 Drawing Sheets

U.S. PATENT DOCUMENTS

| | | | |
|---|---|---|---|
| 4,823,328 A * | 4/1989 | Conklin et al. | 368/47 |
| 5,528,560 A * | 6/1996 | Ogiyama | 368/47 |
| 5,883,594 A * | 3/1999 | Lau | 342/357.1 |
| 6,212,133 B1 * | 4/2001 | McCoy et al. | 368/9 |
| 6,662,107 B2 * | 12/2003 | Gronemeyer | 701/213 |
| 2003/0198140 A1 * | 10/2003 | Shimizu | 368/47 |
| 2004/0202051 A1 * | 10/2004 | Ihara et al. | 368/47 |
| 2005/0259518 A1 * | 11/2005 | Saitoh | 368/47 |
| 2007/0230285 A1 | 10/2007 | Nakagawa | |
| 2008/0031095 A1 * | 2/2008 | Matsuzaki et al. | 368/14 |

FOREIGN PATENT DOCUMENTS

| | | |
|---|---|---|
| EP | 1 722 286 A1 | 11/2006 |
| JP | 10-010251 | 1/1998 |
| JP | 10-082875 | 3/1998 |
| JP | 2001-051077 | 2/2001 |

* cited by examiner

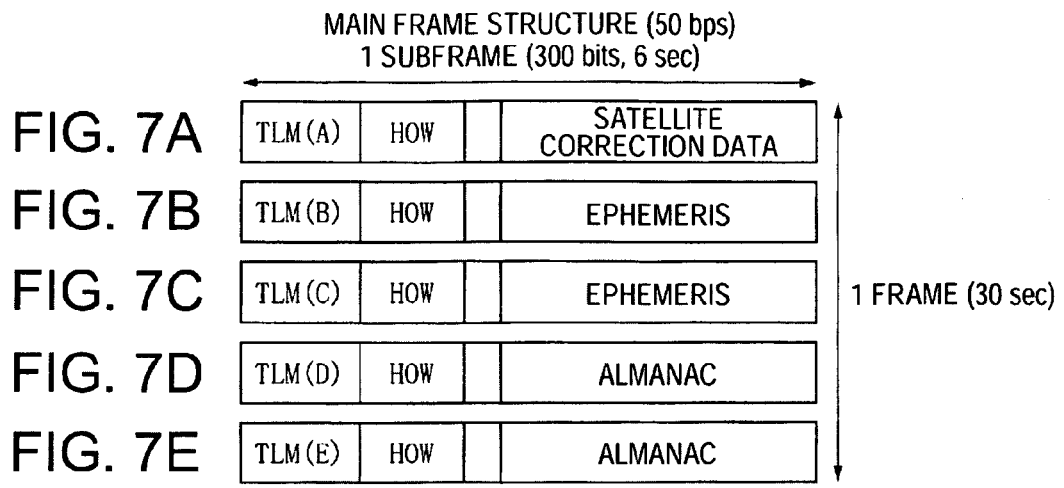
FIG. 7A
FIG. 7B
FIG. 7C
FIG. 7D
FIG. 7E
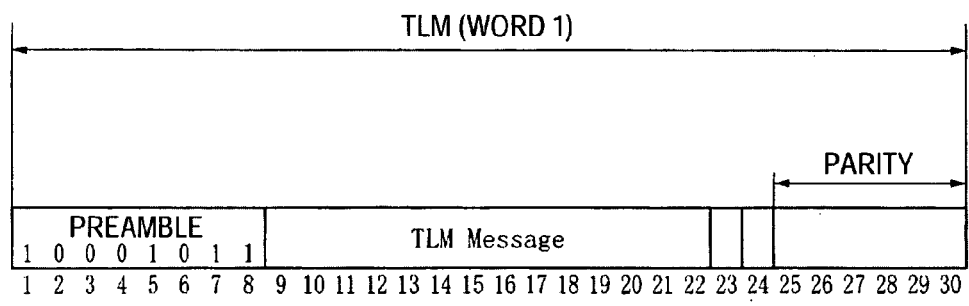
FIG. 8A
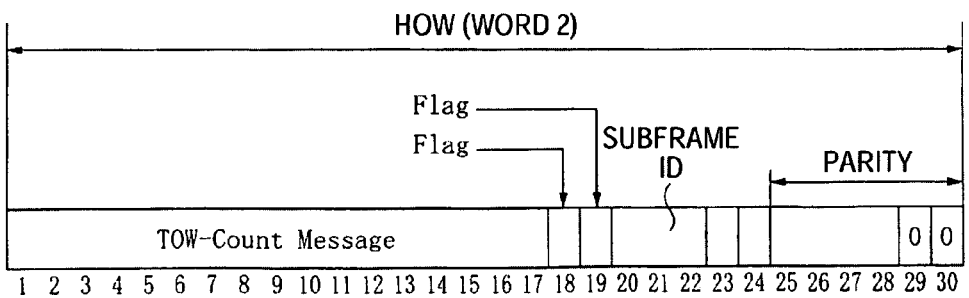
FIG. 8B

TIME ADJUSTMENT DEVICE, TIMEPIECE WITH A TIME ADJUSTMENT DEVICE, AND A TIME ADJUSTMENT METHOD

CROSS-REFERENCE TO RELATED APPLICATIONS

Japanese Patent Application No.(s) 2007-302041, and 2008-154409, are hereby incorporated by reference in their entirety.

BACKGROUND

1. Field of Invention

The present invention relates to a time adjustment device that corrects the time based on signals from a positioning information satellite such as a GPS satellite, to a timepiece that has the time adjustment device, and to a time adjustment method.

2. Description of Related Art

The Global Positioning System (GPS) for determining the position of a GPS receiver uses GPS satellites that circle the Earth on known orbits, and each GPS satellite has an atomic clock on board. Each GPS satellite therefore keeps the time (referred to below as the satellite time or satellite time information) with extremely high precision.

Electronic timepieces that adjust the time using this GPS satellite time information (satellite time information) are known from the literature.

In an electronic timepiece that uses GPS satellite time information (satellite time information), the reception unit that receives signals (navigation messages) from the GPS satellites must receive the TOW signal and the WN signal that are contained in the GPS satellite signals in order to get the time information from the GPS satellite. The TOW (Time of Week) signal is also referred to as the Z count and is a GPS time value that restarts every week and denotes the number of seconds from the beginning of the GPS week. The WN (Week Number) signal is the number of the GPS week in which the current GPS time is contained.

Power consumption increases greatly if the electronic timepiece constantly receives the GPS satellite signals.

Japanese Unexamined Patent Appl. Pub. JP-A-H10-82875 therefore teaches an electronic timepiece that switches between a full-power mode in which the CPU and other parts are driven to receive the GPS satellite signal and acquire the navigation message, and a sleep mode in which the CPU is stopped and the signal is not received, and thus reduces power consumption by intermittently receiving signals from the GPS satellites.

The electronic timepiece taught in JP-A-H10-82875 enters the full-power mode when the power is turned on and when the sleep mode ends to drive the CPU and other parts and acquire the navigation message. The timepiece then extracts the time information contained in the navigation message and adjusts the time.

The time when the next navigation message is acquired, or more specifically the time for correcting the time, is then determined from the relationship between the precision of the crystal (crystal oscillator) that produces the reference clock signal of the electronic timepiece and the required accuracy of the timepiece.

The timepiece then operates in the sleep mode during which the CPU is stopped until it is time to receive the navigation message again. Operation then returns to the full-power mode after this sleep mode period passes to acquire the next navigation message and adjust the time based on the time information extracted from the navigation message.

The electronic timepiece described above enters the full-power mode and acquires the navigation message after the power turns on and when the sleep mode ends. In the full-power mode, the electronic timepiece then acquires time-related data including the Z count, the week number, the UTC parameters, and the satellite signal correction amount.

The Z count can be received every 6 seconds in the GPS satellite signal, but because the week number and other information is carried in subframe 1, which is transmitted every 30 seconds, more time is required when receiving data other than the Z count than when acquiring only the Z count.

This means that each navigation message acquisition process executed in the full-power mode is time-consuming and increased power consumption becomes a problem. As a result, when reducing power consumption in order to increase battery life is desirable such as in a wristwatch, high power consumption in the full-power mode makes it difficult to achieve the desired effect even if power consumption is reduced by inserting a sleep mode.

If much time is needed to acquire the navigation message in a mobile electronic timepiece such as a wristwatch, there is a strong possibility that movement of the electronic timepiece while the signal is being received will change the orientation of the antenna or result in the GPS satellite being hidden by a building. This increases the likelihood of a navigation message acquisition failure, and a corresponding increase in power consumption.

One conceivable solution is to inform the user that the navigation message is being received and direct the user to not move the timepiece during this time, but the timepiece must remain stationary for a relatively long time and ease of use is thus impaired.

SUMMARY OF INVENTION

A time adjustment device, a timepiece device with the time adjustment device, and a time adjustment method according to preferred aspects of the present invention enable acquiring the time information in a short time to reduce power consumption and improve convenience.

A first aspect of the invention is a time adjustment device including a reception unit that receives satellite signals transmitted from positioning information satellites; a time information generating unit that generates internal time information; a time information adjustment component that corrects the internal time information; and a reception controller that controls operation of the reception unit. A satellite signal contains satellite time information that is kept by the transmitting positioning information satellite. The reception unit can select a first reception mode for receiving first information including the hour, minute, and second data in the satellite signal, and a second reception mode for receiving second information including the hour, minute, and second data, week information for the current year, month, and day, and satellite health information in the satellite signal. The time information adjustment component includes a time adjustment recording component that records whether or not the time was adjusted using the second information received in the second reception mode after the internal time information was initialized, a first time information adjustment component that controls the reception unit by way of the reception controller in the first reception mode to receive the first information, and sets the hour, minute, and second values of the internal time information based on the received first information, and a second time information adjustment component that controls the reception unit in the second reception mode to receive the second information, and sets the year, month, day, hour, minute, and second values of the internal time information using the received second information. The first time information adjustment component operates when it is recorded in the time adjustment recording component that the time was adjusted using the second information; and the second time information adjustment component operates when it is not recorded in the time adjustment recording component that the time was adjusted using the second information.

When the time has not been adjusted using the second information after the internal time information is initialized due to a system reset, for example, that is, the first time the time is set after the internal time information is initialized, the second time information adjustment component receives the second information. The time can therefore be set to the correct time immediately after the internal time information is initialized even if the internal time information differs from the actual current time.

If the time has already been adjusted based on the second information, the year, month, and day of the internal time will have been set to the correct values, and the internal time will thereafter not differ from the correct year, month, and day values. The possibility is therefore strong that the internal time can be adjusted using the first information consisting of the hour, minute, and second values, and the internal time information can therefore be adjusted by receiving only this first information.

Because this aspect of the invention enables setting the time by receiving the second information only the first time the satellite signal is received after the internal time information is initialized, and can thereafter set the time by receiving only the first information, the average reception process time can be greatly shortened compared with a conventional electronic timepiece that always receives the entire time-related data set (including the Z count, week number, UTC parameter, and satellite signal correction value) when the satellite signal is received.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, because the second information includes satellite health information, whether the received second information is correct can be easily determined, and the internal time can be adjusted using correct time information.

Furthermore, it is normally sufficient to receive only the first information and the reception process time can be shortened. As a result, the reception time is short and user convenience is not impaired even when the time adjustment device must remain still during reception.

In another aspect of the invention the time information adjustment component has a decision component that determines if the internal time can be adjusted using the first information received in the first reception mode. The time information adjustment component adjusts the internal time using the received first information when the decision component determines that the internal time can be adjusted using the received first information, and operates the second time information adjustment component when the decision component determines that the internal time cannot be adjusted using the received first information.

In this aspect of the invention the decision component determines if the internal time can be adjusted using the received first information. As a result, because the second time information adjustment component receives the second information again if the time was previously adjusted using the second information but it is determined that the internal time cannot be adjusted using the received first information, the correct time including the year, month, day, hour, minute, and second can be set.

Further preferably, the decision component determines that the internal time can be adjusted using the received first information if a difference between the received first information and the internal time data is within a predetermined allowable internal time range, and determines that the internal time cannot be adjusted using the received first information if the difference between the received first information and the internal time data is outside the predetermined allowable internal time range.

Because the decision component determines if the difference between the received first information and the internal time data is within a predetermined allowable internal time range in this aspect of the invention, whether the received first information is correct can be determined when the satellite signal is received after the first time. This prevents adjusting the internal time using the first information when the received first information is incorrect and when the year, month, and day values as well as the hour, minute, second values of the internal time are wrong, and enables reliably setting the correct time based on the second information.

Furthermore, because the second information is only received when the satellite signal is first received and when the difference between the received first information and the internal time information is significant and outside the allowable internal time range after the satellite signal is first received, the average reception process time can be reduced.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, because the first reception mode can normally be used and the reception process time can be shortened, the reception time is short and user convenience is therefore not impaired even when the time adjustment device must remain still during reception.

Further preferably, the first time information adjustment component controls the reception unit in a first reception mode and receives the first information contained in satellite signals transmitted from a plurality of positioning information satellites; and the decision component determines that the internal time can be adjusted using the received first information if the difference between the first information received from the plural positioning information satellites is within a preset allowable satellite time range, and determines that the internal time cannot be adjusted based on the received first information if the difference between the first information exceeds this allowable satellite time range.

Because the decision component determines if the difference between the first information received from a plurality of satellites is within a predetermined allowable satellite time range in this aspect of the invention, whether the received first information is correct can be determined when the satellite signal is received after the first time. This prevents adjusting the internal time using incorrect first information, and enables reliably setting the correct time based on the second information.

Furthermore, because the second information is only received when the satellite signal is first received and when the difference between the received first information values is outside the allowable satellite time range after the satellite signal is first received, the average reception process time can be reduced.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, because the first reception mode can normally be used and the reception process time can be shortened, the reception time is short and user convenience is therefore not impaired even when the time adjustment device must remain still during reception.

In another aspect of the invention the first time information adjustment component controls the reception unit in a first reception mode to receive the first information contained in satellite signals transmitted from a plurality of positioning information satellites. The decision component determines that the internal time can be adjusted using the received first information if the difference between the first information received from the plural positioning information satellites is within a preset allowable satellite time range and the difference between the received first information and the internal time information is within a preset allowable internal time range, and determines that the internal time cannot be adjusted based on the received first information if the difference between the first information exceeds this allowable satellite time range, or the difference between the received first information and the internal time information is outside the allowable internal time range.

Because the decision component determines if the first information is correct by comparing the first information received from a plurality of satellites, and compares the first information with the internal time to confirm if the date portion of the internal time is also incorrect, that is, if the second information is required to adjust the time, the internal time can be reliably set to the correct time.

Furthermore, because the second information is only received when the satellite signal is first received, when the difference between the received first information and the internal time information is great and is outside the allowable internal time range after the satellite signal is first received, and when the difference between the plural received first information is outside the allowable satellite time range, the average reception process time can be reduced.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, because the first reception mode can normally be used and the reception process time can be shortened, the reception time is short and user convenience is therefore not impaired even when the time adjustment device must remain still during reception.

In another aspect of the invention the time information adjustment component operates the second time information adjustment unit, controls the reception unit in the second reception mode, receives the second information, and adjusts the year, month, day, hour, minute, and second of the internal time information based on the received second information within a preset time after the internal time information is initialized.

This preset time may be set with consideration for the time needed to move the time adjustment device to a location where satellite signals from the positioning information satellites can be easily received after the user does something that initializes the internal data, such as a system reset. If the time adjustment device is a wristwatch, for example, and the user causes a system reset while indoors, the wristwatch is preferably set beside a window where satellite signals can be easily received. This preset time may therefore be set to the time required to move the wristwatch near a window, such as approximately one or two minutes.

When the internal time information is initialized, the time information adjustment component according to the present invention operates the second time information adjustment component soon after the initialization (such as within approximately 2 minutes). The time can therefore be automatically adjusted to the correct time even just after the internal time information is initialized when the likelihood is high that the internal time will differ from the actual current time. The user therefore does not need to adjust the time, and convenience can be improved.

A time adjustment device according to another aspect of the invention also has an external operating member that can be operated by a user. The time information adjustment component can select an automatic reception mode that automatically runs the reception process when the internal time reaches a previously set predetermined time, and an unconditional reception mode that unconditionally runs the reception process when an operation of the external operating member that manually starts reception is detected, and operates the second time information adjustment component, controls the reception unit in the second reception mode, receives the second information, and adjusts the year, month, day, hour, minute, and second of the internal time information according to the received second information when the unconditional reception mode is selected.

This aspect of the invention always receives the second information and adjusts the date (year, month, day) and time (hour, minute, second) when the unconditional reception process is invoked, and the year, month, and day as well as the hour, minute, and second can therefore be set correctly. The user is therefore assured that the accurate time will always be set if the user starts reception manually.

More specifically, if only the first information is received and only the hour, minute, and second of the internal time information are adjusted, the year, month, and day of the internal time information will not be adjusted, and the date information may therefore be left incorrect. To prevent this the invention adjusts the year, month, day, hour, minute, and second using the second information, and can therefore reliably set the correct time including the year, month, and day as well as the hour, minute, and second.

In another aspect of the invention the time information adjustment component has an elapsed time recording component that records how much time has passed since the last time the time was adjusted based on the first information or the second information, and operates the second time information adjustment component, controls the reception unit in the second reception mode, receives the second information, and adjusts the year, month, day, hour, minute, and second of the internal time information according to the received second information when the elapsed time is greater than or equal to a set time.

When greater than a preset time has passed since the last time the time was adjusted using the first information or the second information, the internal time may differ greatly from the actual current time depending on the precision of the time information generating unit. In this situation the decision component may decide that second information must be received even if the first information is received. The first information reception process is therefore wasted in this case, and power consumption increases needlessly.

However, because this aspect of the invention receives the second information when the time passed since the last time the time was set exceeds the preset time, it is not necessary to receive the first information and power consumption is reduced accordingly.

This set time can be determined appropriately according to the precision of the time information generating unit, and may be set to 1 day (24 hours), for example.

In another aspect of the invention the time information adjustment component has a manual adjustment recording component that records if the time was adjusted manually after the last time the time was adjusted, and operates the second time information adjustment component, controls the reception unit in the second reception mode, receives the second information, and adjusts the year, month, day, hour, minute, and second of the internal time information according to the received second information the first time the time information is received after the time is manually adjusted.

When the time is set manually, the correct time will not necessarily be set by the user. In this situation the decision component may decide that second information must be received even if the first information is received. The first information reception process is therefore wasted in this case, and power consumption increases needlessly.

However, because this aspect of the invention receives the second information the first time after the time is adjusted manually, it is not necessary to receive the first information and power consumption is reduced accordingly.

In another aspect of the invention the time information adjustment component has a voltage detector that detects the power supply voltage, and prohibits operation of the second time information adjustment component when the power supply voltage goes to or below a set voltage.

In a battery-powered device such as a wristwatch, the power supply voltage may drop sharply due to the long reception time if the second information is received when the power supply voltage is low, and the system may shutdown.

This aspect of the invention, however, enters a low power mode and prohibits operation of the second time information adjustment component when the power supply voltage drops to or below a set voltage level, and can therefore prevent the voltage from dropping suddenly.

This voltage setting may be set referenced to a voltage that could result in a sudden voltage drop and a system shutdown if the second information is received.

In another aspect of the invention when the second time information adjustment component controls the reception unit in the second reception mode and receives the second information including the year, month, day, hour, minute, second, and satellite health information in the satellite signal, the second time information adjustment component determines if a flag denoting the satellite signal is usable is set in the satellite health information, and adjusts the year, month, day, hour, minute, second of the internal time information based on the received second information if the flag is set, and receives a satellite signal transmitted from a different positioning information satellite to adjust the internal time information if the flag is not set.

Because the second information includes the satellite health information, whether the received second information is correct or not can be easily confirmed. Therefore, when the flag (information) declaring that the satellite signal can be used is not recorded in the satellite health information, the second time information adjustment component receives a satellite signal from a different positioning information satellite and continues processing to acquire the correct time information and set the internal time to the correct time.

Another aspect of the invention is a timepiece with a time adjustment device including the time adjustment device described above and a time display unit that displays the internal time information.

The timepiece with a time adjustment device according to the present invention conditionally switches operation between a time adjustment process that receives only first information and a time adjustment process that receives second information. The average reception process time can therefore be greatly reduced.

As a result, power consumption can be reduced, the duration time of the timepiece can be increased, and the invention can be advantageously used in a portable timepiece such as a wristwatch.

In addition, because it is only necessary to receive the first information after the first reception operation is completed, the reception process time can be shortened and the reception time is short, and user convenience is therefore not impaired even when the time adjustment device must remain still during reception. The invention is therefore particularly well suited to use in portable timepieces such as wristwatches and pocket watches.

Another aspect of the invention is a time adjustment method including a time information generating step that generates internal time information; an adjustment recording step that records in a time adjustment recording component whether or not the time was adjusted using second information after the internal time information was initialized, the second information including the hour, minute, and second data, week information for the current year, month, and day, and satellite health information contained in a satellite signal received from a positioning information satellite; a first information time adjustment step that controls the reception unit in a first reception mode to receive first information composed of the hour, minute, second information in the satellite signal, and sets the hour, minute, and second values of the internal time information based on the received first information; and a second information time adjustment step that controls the reception unit in a second reception mode to receive the second information, and sets the year, month, day, hour, minute, and second values of the internal time information using the received second information; wherein the first information time adjustment step operates when it is recorded in the time adjustment recording component that the time was adjusted using the second information; and the second information time adjustment step operates when it is not recorded in the time adjustment recording component that the time was adjusted using the second information.

If the time is set based on the second information after the internal time information is initialized by a system reset, for example, that the time was set based on the second information is recorded in the time adjustment recording component in this aspect of the invention. Therefore, because there is no record of the time having been adjusted the first time the time is set after the internal time information is initialized, the time is set by the second information time adjustment step.

After the time is set based on the second information, that the time was adjusted is recorded in the time adjustment recording component. The time is therefore set by the first information time adjustment step any time the time is adjusted thereafter because there is a record of the time having been set in the time adjustment recording component.

This aspect of the invention thus determines if the time has been previously set based on the second information, and the average reception process time can be shortened because the second information is normally received only during the first reception process.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, because the first reception mode can normally be used and the reception process time can be shortened, the reception time is short and user convenience is therefore not impaired even when the time adjustment device must remain still during reception.

The time adjustment method of the invention can also be adapted to include the content of the second to eleventh claims of the invention.

For example, as described in claim 2, the time adjustment method may have a decision step that determines if the internal time can be adjusted using the first information received in the first reception mode. If the decision step determines that the internal time can be adjusted using the first information when the first information is received, the internal time is adjusted using the received first information. When the decision component determines that the internal time cannot be adjusted using the received first information, the second time information adjustment component can be driven.

In another aspect of the invention as described in claim 3, the decision step determines that the internal time can be adjusted using the received first information if a difference between the received first information and the internal time data is within a predetermined allowable internal time range, and determines that the internal time cannot be adjusted using the received first information if the difference between the received first information and the internal time data is outside the predetermined allowable internal time range.

In another aspect of the invention as described in claim 4, the first information reception step receives the first information contained in satellite signals transmitted from a plurality of positioning information satellites; and the decision step determines that the internal time can be adjusted using the received first information if the difference between the first information received from the plural positioning information satellites is within a preset allowable satellite time range, and determines that the internal time cannot be adjusted based on the received first information if the difference between the first information exceeds this allowable satellite time range.

In another aspect of the invention as described in claim 5, the decision step determines that the internal time can be adjusted using the received first information if the difference between the first information received from the plural positioning information satellites is within a preset allowable satellite time range and the difference between the received first information and the internal time information is within a preset allowable internal time range, and determines that the internal time cannot be adjusted based on the received first information if the difference between the first information exceeds this allowable satellite time range, or the difference between the received first information and the internal time information is outside the allowable internal time range.

The content of claims 6 to 11 can be similarly applied to the time adjustment method according to the invention.

BRIEF DESCRIPTION OF THE DRAWINGS

FIG. 7 schematically describes the structure of the GPS satellite signal.

FIG. 8 schematically describes the structure of the GPS satellite signal.

DESCRIPTION OF THE PREFERRED EMBODIMENTS

Preferred embodiments of the present invention are described below with reference to the accompanying figures.

The embodiments described below are specific preferred embodiments of the present invention and certain technically preferred limitations are therefore also described, but the scope of the present invention is not limited to these embodiments or limitations unless specifically stated below.

Embodiment 1

Figure 1:
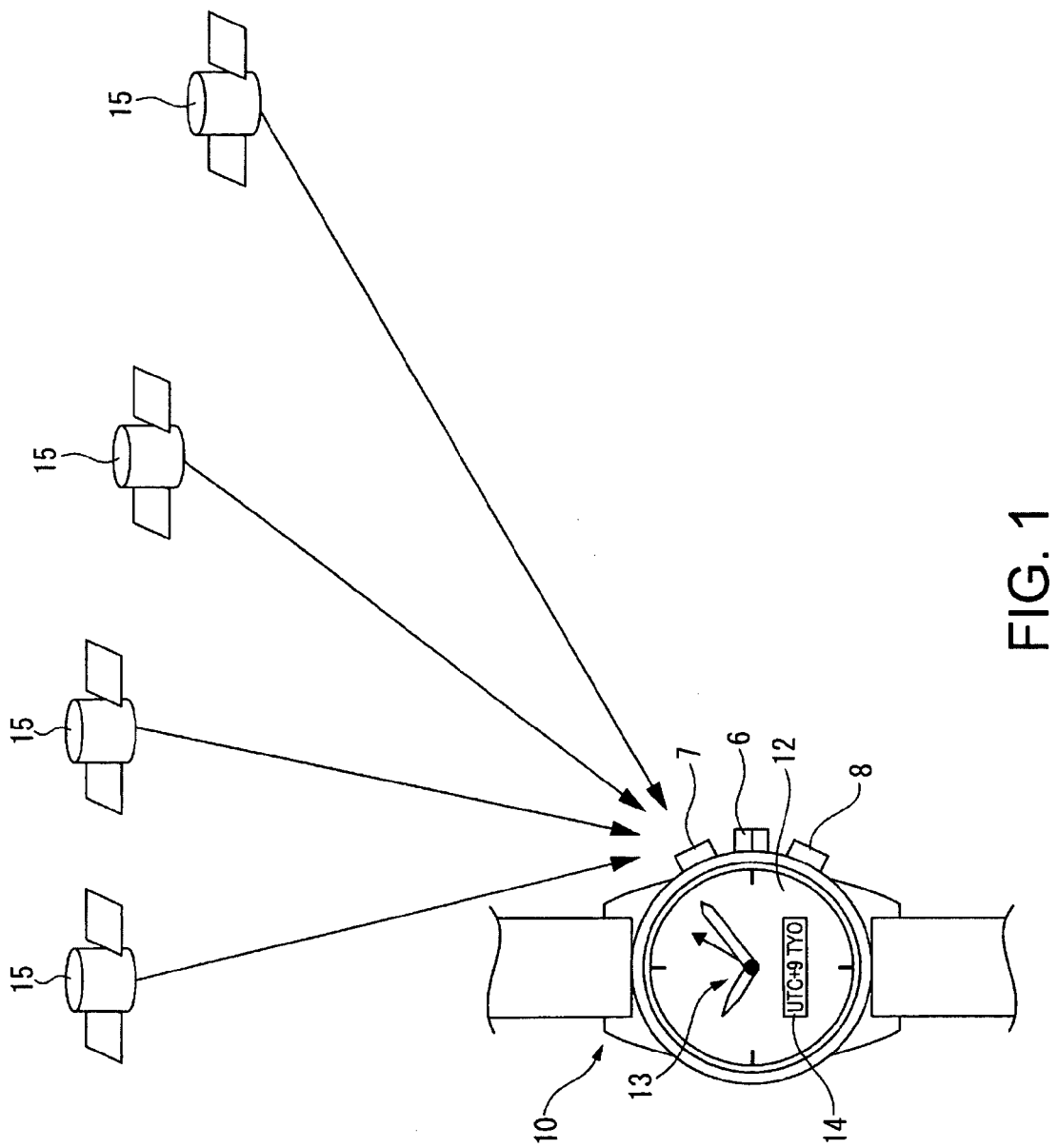
FIG. 1 is a schematic diagram showing a wristwatch with a GPS time adjustment device as an example of a timepiece with a time adjustment device according to the present invention.
Figure 2:
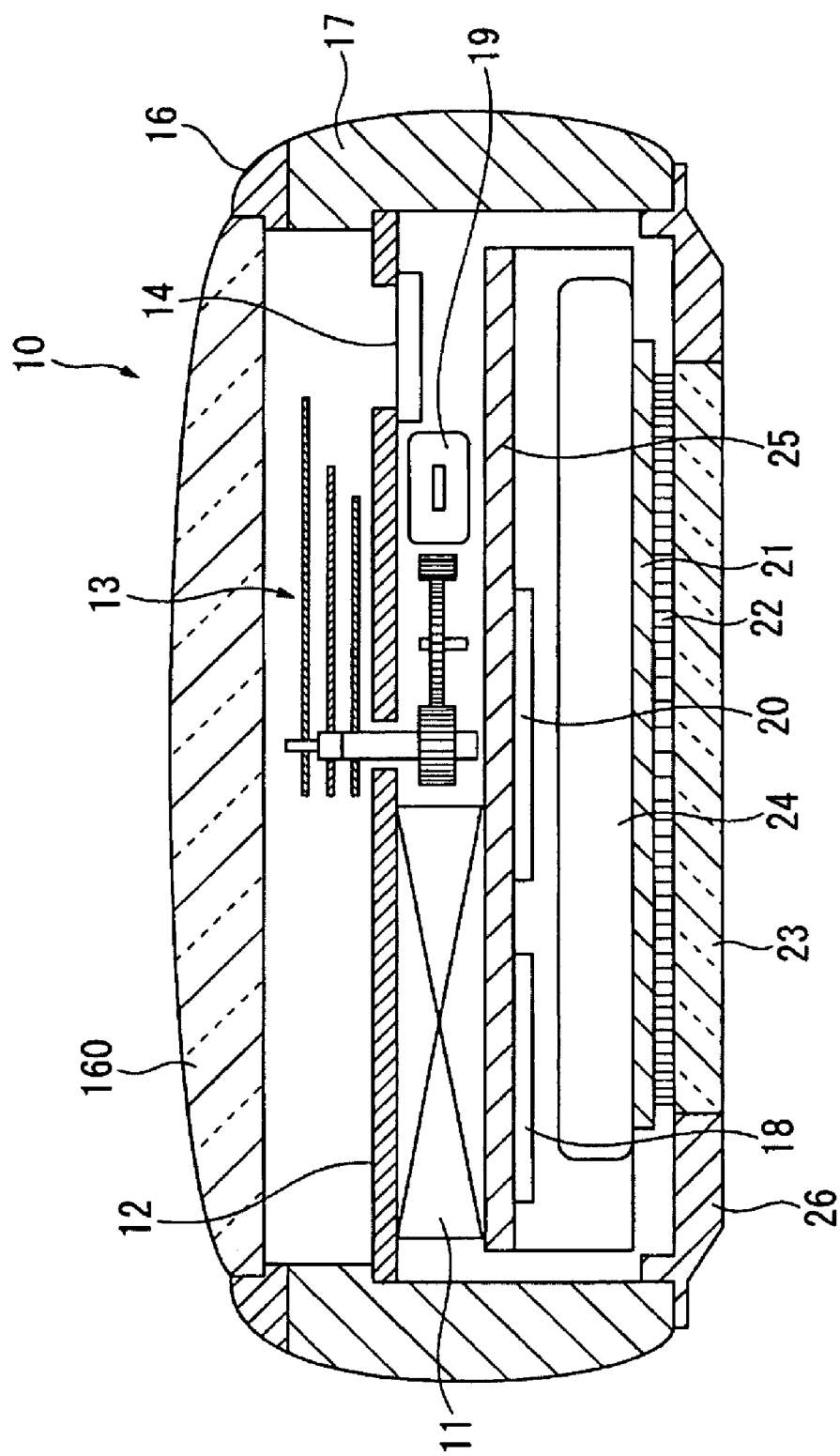
FIG. 2 is a schematic section view of the wristwatch with a GPS time adjustment device shown in FIG. 1.
Figure 3:
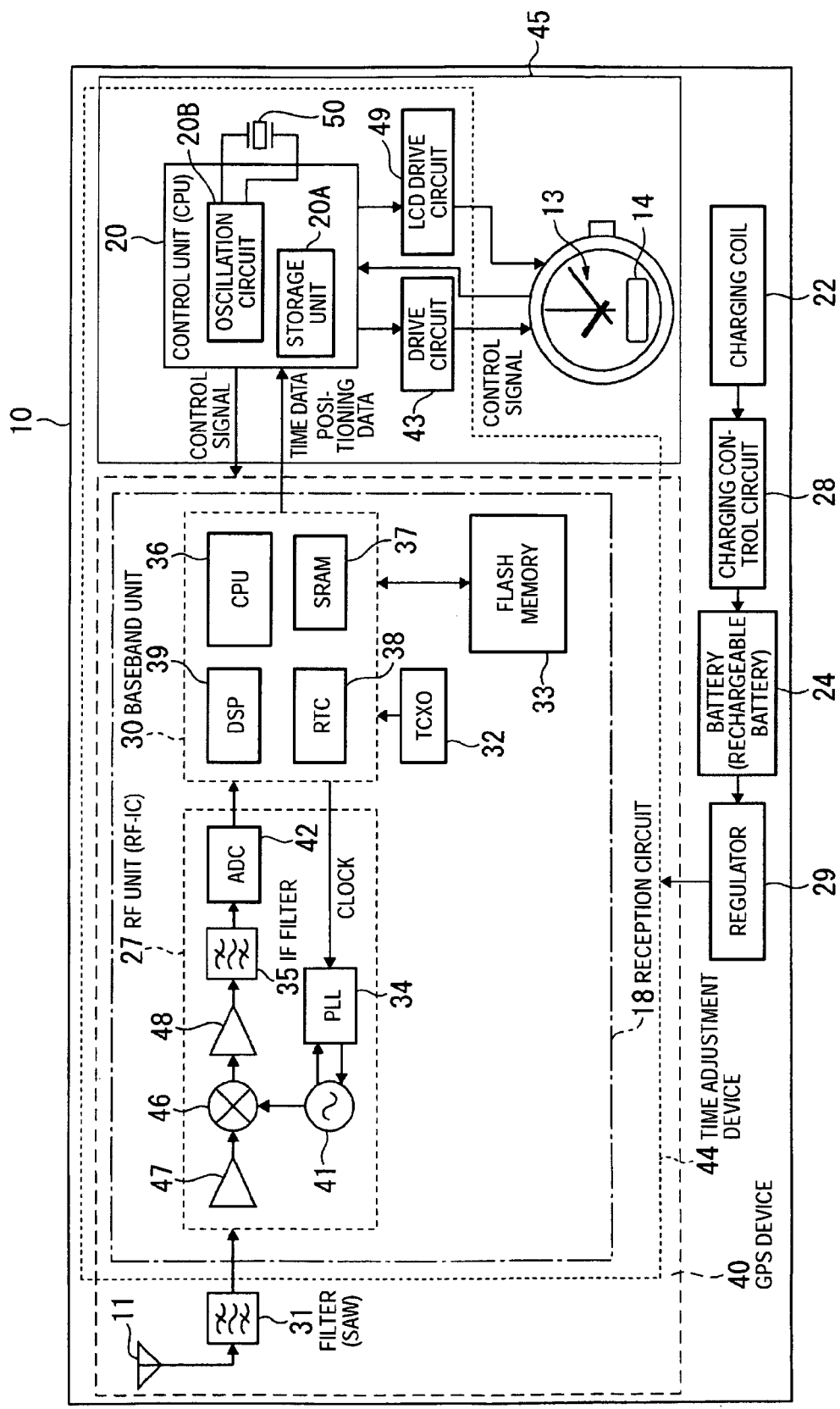
FIG. 3 is a block diagram showing the main internal hardware configuration of the wristwatch with a GPS time adjustment device shown in FIG. 1 and FIG. 2.

FIG. 1 is a schematic diagram showing a wristwatch with a GPS time adjustment device 10 (referred to below as a GPS wristwatch 10) as an example of a timepiece with a time adjustment device according to the present invention. FIG. 2 is a section view of the GPS wristwatch 10 shown in FIG. 1. FIG. 3 is a block diagram showing the main internal hardware configuration of the GPS wristwatch 10 shown in FIG. 1 and FIG. 2.

As shown in FIG. 1, the GPS wristwatch 10 has a time display unit including a dial 12 and hands 13. A window is formed in a part of the dial 12, and a display 14 such as an LCD panel is located in this window.

The hands 13 include a second hand, minute hand, and hour hand, and are driven through a wheel train by way of a stepping motor described below.

The display 14 is typically a LCD unit and is used for displaying calendar information such as the year, month, and day, the current time at the selected city, and messages such as the reception condition.

The GPS wristwatch 10 receives satellite signals from a plurality of GPS satellites 15 orbiting the Earth on fixed orbits in space, acquires satellite time information, and adjusts the internally kept time based on the satellite time information.

The GPS satellite 15 is an example of a positioning information satellite in the invention, and a plurality of GPS satellites 15 are orbiting the Earth in space. At present there are approximately 30 GPS satellites 15 in orbit.

The GPS wristwatch 10 has a crown 6 and buttons 7 and 8 as external operating members.

Internal Configuration of the GPS Wristwatch

The internal configuration of the GPS wristwatch 10 is described next.

As shown in FIG. 2, the GPS wristwatch 10 has an outside case 17 that is made of stainless steel, titanium, or other metal.

The outside case 17 is basically cylindrically shaped, and a crystal 160 is attached to the opening on the face side of the outside case 17 by an intervening bezel 16. A back cover 26 is attached to the opening on the back side of the outside case 17. The back cover 26 is annular and made of metal, and a back glass unit 23 is attached to the opening in the center.

Inside the outside case 17 are disposed a stepping motor for driving the hands 13, a GPS antenna 11, and a battery 24.

The stepping motor is a device that is commonly used in timepieces, and has a motor coil 19 and a stator and rotor not shown. The stepping motor drives the hands 13 by way of an intervening wheel train.

This GPS antenna 11 is a patch antenna for receiving satellite signals from a plurality of GPS satellites 15 orbiting the Earth on fixed orbits in space. The GPS antenna 11 is located on the opposite side of the dial 12 as the side on which the time is displayed, and receives RF signals through the crystal 160 and the dial 12.

The dial 12 and crystal 160 are therefore made from materials that pass RF signals, particularly the satellite signals transmitted from the GPS satellites 15. The dial 12, for example is plastic. The bezel 16 is ceramic in order to improve satellite signal reception.

A circuit board 25 is disposed on the back cover side of the GPS antenna 11, and a battery 24 is disposed on the back cover side of the circuit board 25.

The circuit board 25 is also populated with various circuit devices (such as IC devices) including a reception circuit 18 (reception unit) that processes signals received by the GPS antenna 11 as described below, and a control unit 20 that controls, for example, the stepping motor that drives the hands 13. The reception circuit 18 and the control unit 20 operate using power supplied from the battery 24.

The battery 24 is a lithium-ion battery or other type of storage battery. A magnetic sheet 21 is disposed below (on the back cover side of) the battery 24, and a charging coil 22 is disposed with the magnetic sheet 21 between it and the battery 24. The battery 24 can therefore be charged by the charging coil 22 by way of electromagnetic induction from an external charger. The magnetic sheet 21 can also divert the magnetic field. The magnetic sheet 21 therefore reduces the effect of the battery 24 and enables the efficient transmission of energy. The back glass unit 23 is disposed in the center part of the back cover 26 to facilitate power transmission.

The GPS wristwatch 10 is arranged as described above.

Circuit Design of the GPS Wristwatch

The circuit design of the GPS wristwatch 10 is described next.

As shown in FIG. 3, the GPS wristwatch 10 also has a time display device 45, a GPS device 40, and a time adjustment device 44, and functions as a computer. As shown in FIG. 3, the time display device 45, the GPS device 40, and the time adjustment device 44 share some parts.

The arrangement shown in FIG. 3 is further described below.

GPS Device

As shown in FIG. 3, the GPS wristwatch 10 has a GPS device 40 that receives and processes satellite signals received from a GPS satellite 15.

The GPS device 40 includes the GPS antenna 11, a filter (SAW) 31, and the reception circuit 18. The filter (SAW) 31 is a bandpass filter and in this embodiment of the invention extracts a 1.5-GHz satellite signal. The GPS device 40 thus renders the reception unit of the present invention.

The reception circuit 18 processes the satellite signal extracted by the filter, and includes an RF (radio frequency) unit 27 and baseband unit 30.

The RF unit 27 includes a PLL 34, IF filter 35, VCO (voltage controlled oscillator) 41, A/D converter 42, mixer 46, low noise amplifier 47, and IF amplifier 48.

The extracted satellite signal is amplified by the low noise amplifier 47, mixed by the mixer 46 with the signal from the VCO 41, and down-converted to an IF (intermediate frequency) signal.

The IF signal mixed by the mixer 46 passes the IF amplifier 48 and IF filter 35, and is converted to a digital signal by the A/D converter 42.

The baseband unit 30 also includes a digital signal processor (DSP) 39, a CPU (central processing unit) 36, SRAM (static random access memory) 37, and a real-time clock (RTC) 38. A temperature-compensated crystal oscillator (TCXO) 32 and flash memory 33 are also connected to the baseband unit 30.

The baseband unit 30 then processes the digital signal input from the A/D converter 42 of the RF unit 27 based on a control signal, and processes the satellite signal to acquire the satellite time information and positioning information.

The clock signal of the PLL 34 is generated by the TCXO 32.

The real-time clock 38 counts up at the reference clock output from the TCXO 32.

Time Adjustment Device

The time adjustment device 44 includes the reception circuit 18, the control unit 20, a drive circuit 43, an LCD drive circuit 49, and a crystal oscillator 50. This time adjustment device 44 renders the time information correction unit of the invention.

The control unit 20 includes a storage unit 20A and an oscillation circuit 20B. The control unit 20 controls the GPS device 40, controls driving the hands 13 through the drive circuit 43, and controls driving the display 14 through the LCD drive circuit 49. More specifically, the control unit 20 sends a control signal to the reception circuit 18, and controls the reception operation of the GPS device 40.

The storage unit 20A stores the time data (satellite time information) acquired by the baseband unit 30 of the reception circuit 18.

Figure 4:
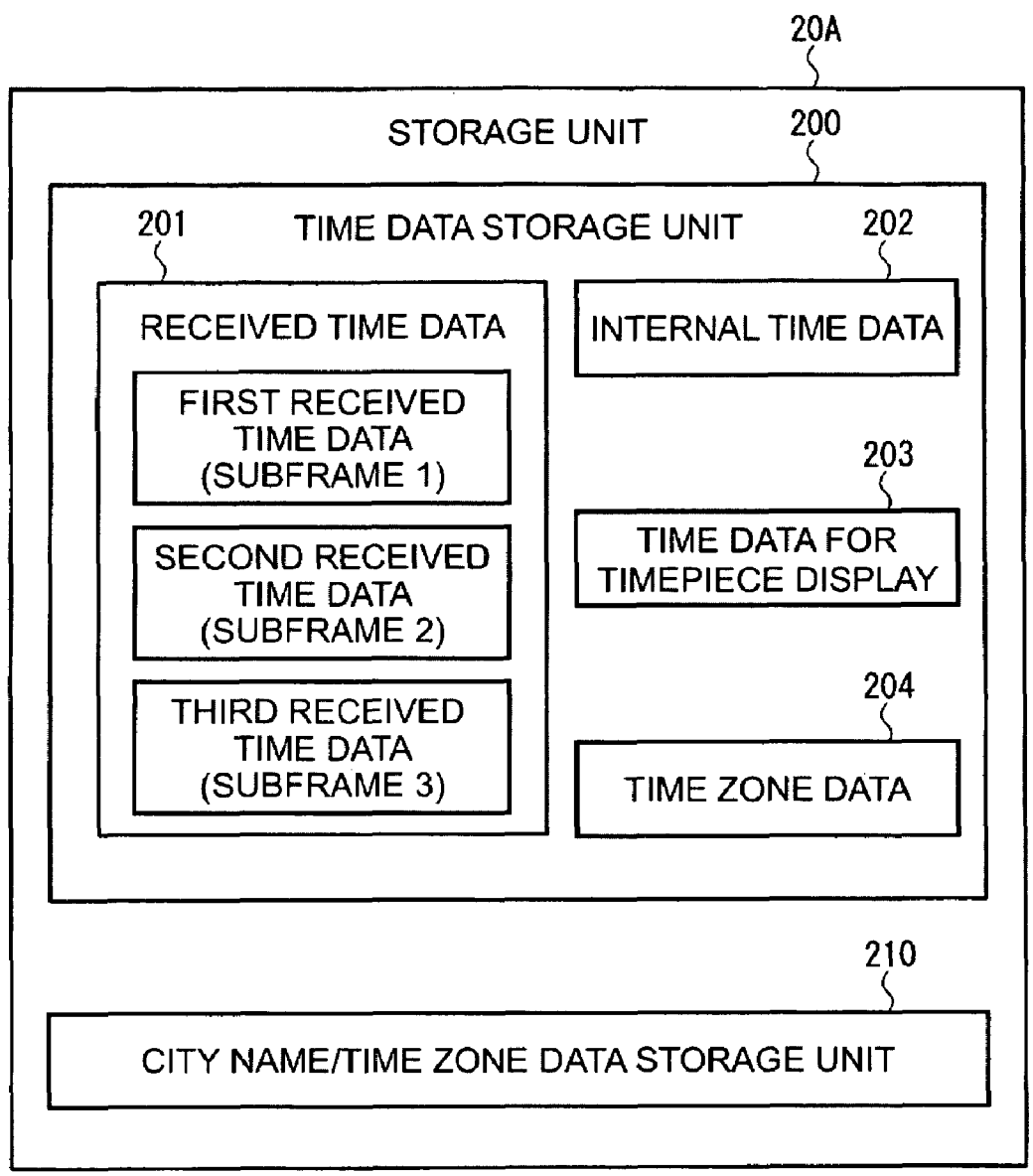
FIG. 4 is a block diagram showing the configuration of the storage unit in a first embodiment of the invention.

More specifically, as shown in FIG. 4, the storage unit 20A has a time data storage unit 200 and a city name/time zone data storage unit 210.

The time data storage unit 200 stores the received time data 201, internal time data 202, time data for timepiece display 203, and time zone data 204.

Three units of received time data, such as the time data from subframes 1 to 3, can be stored as the received time data 201.

The internal time data 202 stores the satellite time information acquired from the satellite signal. The satellite time information stored in the internal time data 202 is updated based on a reference signal generated by the oscillation circuit 20B and crystal oscillator 50 connected to the control unit 20. The supply of power to the reception circuit 18 can therefore be stopped while continuing to update the internal time and move the hands 13. The control unit 20 and crystal oscillator 50 thus render a time information generating unit that generates the internal time.

The time data for timepiece display 203 stores the time acquired by adjusting the UTC (Universal Coordinated Time) to reflect the time zone stored in the time zone data 204. The UTC is acquired by adding the UTC parameter (which is the cumulative leap seconds that is the difference between the GPS time and the UTC, currently −14 seconds) to the internal time data 202, which is the satellite time acquired from the satellite signal.

The time zone data 204 stores the time zone set by the user, for example.

The city name/time zone data storage unit 210 stores time zone information for selected cities, and stores the time zone information correlated to the city names. More specifically, when the user selects the name of a city for which the current time is desired, the control unit 20 searches the city name/time zone data storage unit 210 for the city name selected by the user to get the time zone data for that city.

Time Display Device

The time display device 45 includes the control unit 20, the drive circuit 43, the LCD drive circuit 49, the crystal oscillator 50, the hands 13, and the display 14.

The control unit 20 controls the time displayed by the hands 13 and display 14 based on the time data stored in the time data for timepiece display 203.

When the satellite time information acquired by the baseband unit 30 is stored in the storage unit 20A and the time data for timepiece display 203 is updated, the control unit 20 displays the corrected time on the display 14 by way of the drive circuit 43.

The control unit 20 also calculates the difference between the current time indicated by the hands 13 and the corrected time data for timepiece display 203, drives the stepping motor to move the hands 13 an amount equal to this time difference, and thus controls the hands 13 to display the corrected time.

When the control unit 20 in this embodiment of the invention detects that button A 7 was pressed, it displays the reception history on the display 14. The control unit 20 may display the last three reception times and the reception result (success or failure) on the display 14.

If the control unit 20 detects that button A 7 is held depressed for a prescribed time or longer (such as 3 seconds or more), it executes an unconditional reception process.

This embodiment of the invention executes the reception process when reception is thus initiated unconditionally by the user, and when the reception process is executed automatically at a predetermined reception time (such as at 2:00 a.m.) These processes differ only in the conditions for starting reception, and operate in the same way after reception starts.

If the control unit 20 detects that button B 8 has been pressed for a predetermined time or longer (such as 3 seconds or more), it goes to the city name selection mode.

In the city name selection mode the control unit 20 displays the currently set city name and the corresponding time zone in the display 14 as shown in FIG. 1. In the example shown in FIG. 1, the time zone is indicated by the time difference to UTC ("UTC+9" in FIG. 1, denoting the time zone +9 hours ahead of UTC), and the name of a major city in that time zone ("TYO", the abbreviation for Tokyo, in FIG. 1).

Each time button A 7 is pressed in the city name selection mode the time difference shown in the display 14 advances one time zone ahead (the positive direction), and each time button B 8 is pressed the time difference shown in the display 14 moves back one time zone in the negative direction.

When the desired city name is selected and a predetermined time (such as 10 seconds) passes without button A 7 or button B 8 being pressed, the selection of the currently selected and displayed city name is set and the city name selection mode is cancelled.

The GPS wristwatch 10 according to this embodiment of the invention is driven by power supplied from the battery 24 through a regulator 29. More specifically, the charging coil 22 charges the battery 24 with power through the charging control circuit 28. The battery 24 supplies drive power to the time adjustment device 44, for example, through the regulator 29.

A lithium ion battery or other rechargeable storage battery is used as the battery 24 in this embodiment of the invention, but a lithium battery or other type of primary battery may be used instead. The charging method when a secondary storage battery is used is not limited to using a charging coil 22 to charge by way of electromagnetic induction from an external charger as used in this embodiment of the invention, and the battery may be charged using a solar cell or other type of generating device disposed to the GPS wristwatch 10.

System Configuration of the Time Adjustment Device (Time Information Adjustment Component)

Figure 5:
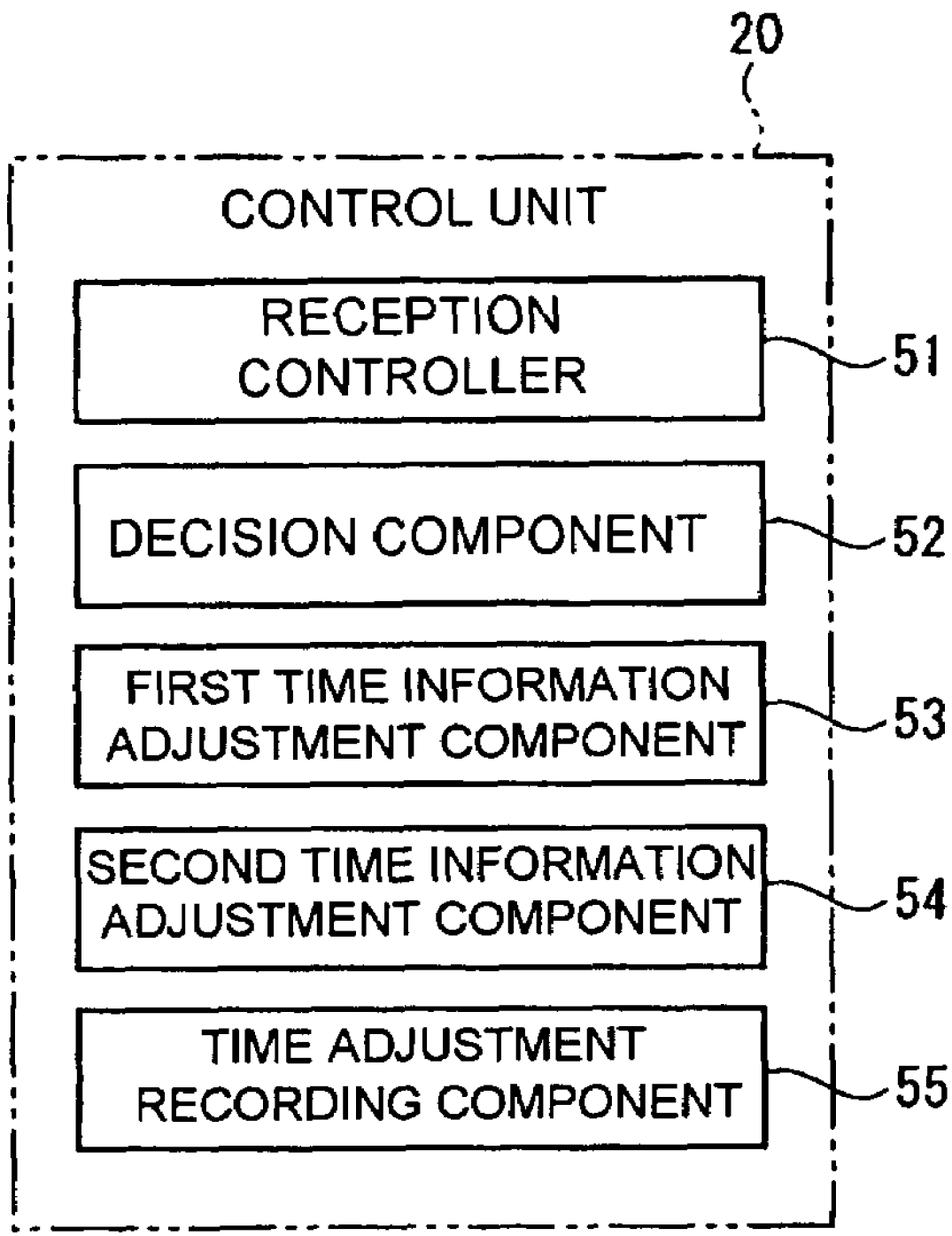
FIG. 5 is a block diagram showing the configuration of the control unit in a first embodiment of the invention.

The system configuration of the time adjustment device 44, which is the time information adjustment component of the invention, is described next with reference to FIG. 5. FIG. 5 shows the function blocks rendered by the program executed mainly by the control unit 20.

As shown in FIG. 5, the control unit 20 has a reception controller 51, a decision component 52, a first time information adjustment component 53, a second time information adjustment component 54, and a time adjustment recording component 55.

The time adjustment recording component 55 records whether subframe 1 of the satellite signal was received and the internal time data 202 was adjusted based on the second information (Z count, week number, and satellite health) contained in subframe 1 after a system reset of the GPS wristwatch 10, such as when the power turns on again after the battery is replaced.

Time Adjustment Process

The operation of the GPS wristwatch 10 is described next with reference to the flow chart in FIG. 6.

This first embodiment of the invention determines if subframe 1 was received and the time was previously adjusted based on the second information (year, month, day, hour, minute, second, and the satellite health information) contained in subframe 1. If the time was adjusted, only the Z count, which is referred to as "first information" herein, is received. If the time was not adjusted, subframe 1 is received and the second information is acquired.

In addition, if the difference to the internal time (the internal time deviation) is less than or equal to a predetermined value (is within an allowable internal time range) when the first information is received, the time of the internal clock is corrected using the received Z count. If the internal time deviation is greater than the allowable internal time range, the second information including the Z count, week information including the year, month, and day, and satellite health information for confirming the condition of the satellite signal, is acquired, and the internal time data is corrected.

The GPS wristwatch 10 also enables selecting an automatic adjustment mode or a no-adjustment mode by way of a control signal from the control unit 20. In the automatic adjustment mode the satellite signal from a GPS satellite 15 is automatically received at a regular interval and the time is adjusted. The time is not adjusted automatically in the no-adjustment mode. These modes can be selected by manually operating the crown 7 or a button 7 or 8 disposed to the GPS wristwatch 10.

The GPS wristwatch 10 can also execute an unconditional adjustment mode in which receiving the satellite signal and adjusting the time is forced by operating the crown 6 or a button 7 or 8.

Figure 6:
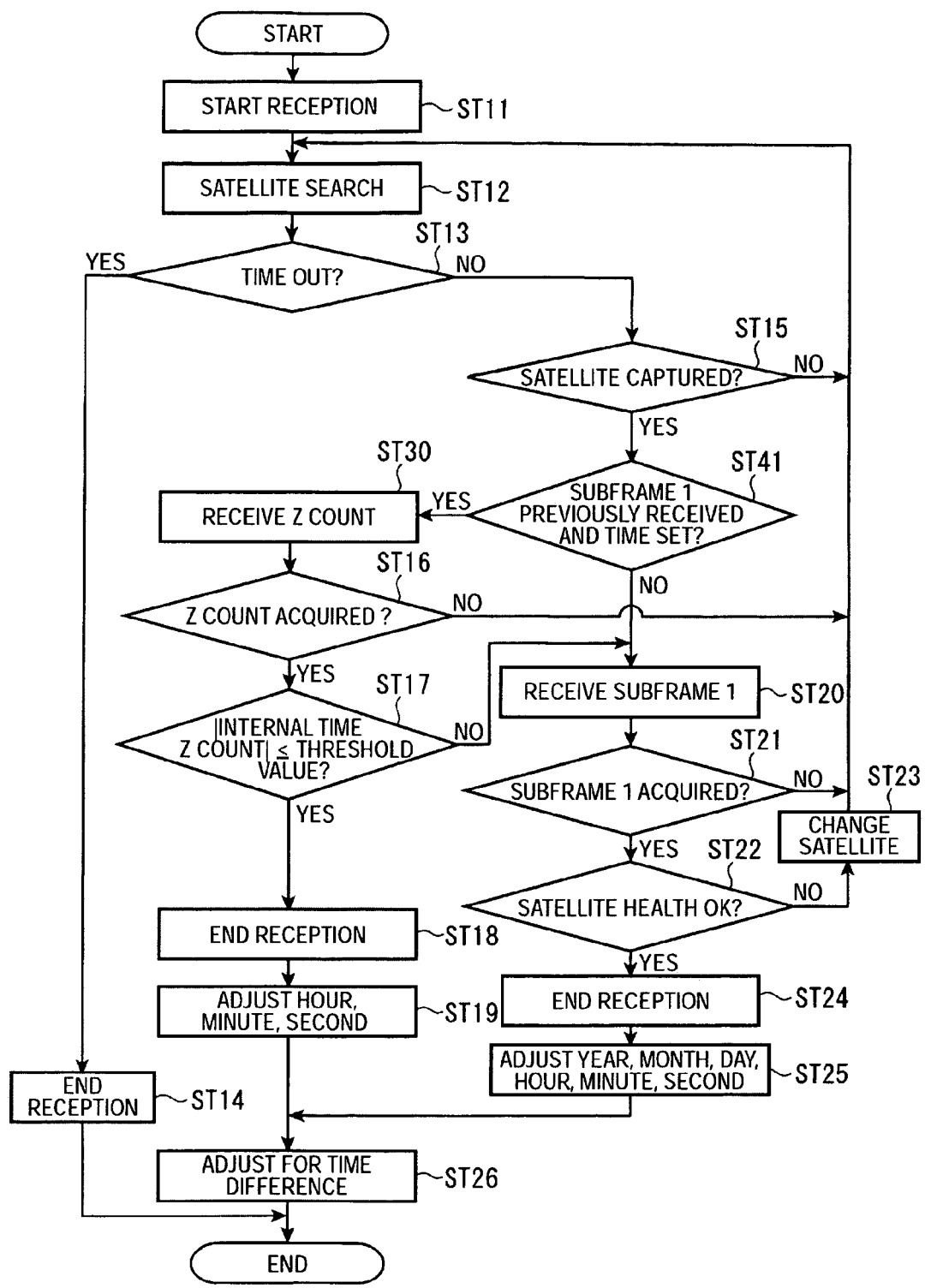
FIG. 6 is a flow chart describing the time adjustment operation of the first embodiment of the invention.

When the automatic adjustment mode is set, the GPS wristwatch 10 executes the time adjustment process shown in FIG. 6 when the predetermined reception time (reception timing) arrives.

The GPS wristwatch 10 also executes the time adjustment process shown in FIG. 6 when the unconditional reception process is started by a manual operation.

The reception time in the automatic adjustment mode is set referenced to a time such as described below. If the GPS wristwatch 10 is accurate to a maximum of approximately 0.5 second per day, the number of times per day that the satellite signal is received from the GPS satellite 15 to correct the time can be limited to 2 or 3 times per day. The GPS wristwatch 10 therefore preferably receives the satellite signal at times during the day when it is in a good environment for receiving satellite signals from a GPS satellite 15. The reception time is therefore set to a time when the GPS wristwatch 10 is likely to be in an environment where reception conditions are good.

The reception time is therefore set to a time such as 2:00 or 3:00 a.m., or 7:00 or 8:00 a.m.

Setting the reception time to 2:00 or 3:00 a.m. is effective because the likelihood is high that the GPS wristwatch 10 is not being used by the user and is removed from the wrist and left stationary indoors at a time when electrical appliance use is minimal and the signal reception environment is best.

Setting the reception time to 7:00 or 8:00 a.m. is also effective because this is the typical time for commuting to work or school, and the likelihood is high that the user is wearing the GPS wristwatch 10 and the GPS wristwatch 10 will be outdoors sometime during this period. More particularly, even if the user is inside a building or factory where satellite signal reception is poor while at work, the user is likely outdoors while commuting, and the likelihood is therefore greater that the signal reception environment is good and the satellite signal can be received.

When the time adjustment process is executed the reception controller 51 of the GPS wristwatch 10 controls the GPS device 40 and runs the reception process.

More specifically, the reception controller 51 starts the GPS device 40 and executes the start reception step ST11 to start receiving the satellite signal sent from a GPS satellite 15. Yet more specifically, the GPS device 40 generates the C/A (Coarse/Acquisition) code pattern described below of the GPS satellite 15 to be received in order to receive the GPS signal as the satellite signal from the GPS antenna 11, and starts receiving.

The reception controller 51 then runs the satellite search step ST12 to detect the signal level. In the satellite search step ST12 the reception controller 51 searches sequentially for the GPS satellites using the procedure described below to receive the satellite signals and determine the SNR of each received signal.

More specifically, the reception controller 51 first searches sequentially from satellite number SV 1 to 30 in the satellite search step ST12 to find the GPS satellite 15 corresponding to each satellite number SV and detect the signal (SNR). When the reception controller 51 detects a GPS satellite 15 with an SNR equal to or greater than a predetermined level (such as 40 in this example), the reception controller 51 interrupts the satellite search step ST12 and proceeds to step ST13.

In the satellite search step ST12 the reception controller 51 adjusts the output timing of the C/A code of the GPS satellite 15 and searches for a GPS satellite 15 with which it can synchronize.

Satellite signals from all of the GPS satellites 15 are transmitted on the same frequency, but are transmitted using code division multiple access (CDMA) by using a different C/A code for each GPS satellite 15. The GPS satellites 15 that can currently be captured can therefore be determined by reading the C/A code contained in the received satellite signal.

The reception controller 51 therefore adjusts the output timing of the C/A code pattern of each GPS satellite 15 to search for a GPS satellite 15 with which it can synchronize. That is, by detecting the correlation between the received satellite signal and the C/A code generated by the reception controller 51, the output will have an output peak at a predetermined time if the C/A codes are the same, but the output will not have a peak and be substantially flat at zero if the C/A codes differ.

The signal level of the satellite signal can also be acquired by determining the SNR of the synchronized satellite signal.

The reception controller 51 then stores information (such as the satellite number SV) about the GPS satellite 15 located by searching and the signal level of the detected satellite in SRAM 37 or other storage unit.

Note that the code length of the C/A code is 1 ms, and a search for all approximately 30 GPS satellites 15 can be conducted in approximately 2 seconds by adjusting the C/A code output time while searching.

The reception controller 51 then determines if reception timed out based on whether or not the time passed since the satellite search started exceeds a predetermined time (such as 6 seconds) (ST13).

More specifically, if a satellite can be detected, the GPS satellite 15 search process should be completed within a maximum 2 seconds. Therefore, if a GPS satellite 15 with an SNR of 40 or higher is detected after the satellite search starts in satellite search step ST12 and the satellite search step ST12 is interrupted, the predetermined time (6 seconds) has not passed in the time-out detection process ST13, and reception has not timed out.

However, if the detected signal level is less than the predetermined level, and more specifically if the SNR is less than 40, and synchronization with the GPS satellite 15 is not possible even though a predetermined time, such as 6 seconds in this example, has passed since the start of the satellite search step ST12, the reception controller 51 determines that reception timed out.

If reception has timed out in ST13, the reception controller 51 unconditionally ends operation of the GPS device 40 and ends reception (ST14).

If the GPS wristwatch 10 is located where reception is not possible, such as when it is indoors, a time-out occurs because there is no GPS satellite 15 which it can synchronize even if the GPS satellite 15 search continues. Continuing to operate the GPS device 40 will therefore needlessly consume and waste power.

Therefore, if the GPS wristwatch 10 determines in step ST13 that a GPS satellite 15 could not be detected even though operation has continued for the predetermined time, the GPS satellite 15 search (reception) ends in ST14. Wasteful consumption of power is therefore reduced.

However, if the GPS wristwatch 10 determines that reception has not timed out in ST13, the reception controller 51 selects the detected GPS satellite 15 and confirms if that GPS satellite 15 was captured (ST15).

More specifically, the reception controller 51 uses the C/A code corresponding to the selected GPS satellite 15 and synchronizes with the satellite signal. The reception controller 51 determines whether the satellite was captured or not based on whether the navigation message can be decoded. As described below, the navigation message is the satellite signal from the GPS satellite 15.

If the satellite capture detection process ST15 determines that the satellite could not be captured, control goes to step ST12 and the search that was interrupted when a GPS satellite 15 with an SNR greater than or equal to 40 was detected resumes from the GPS satellite 15 of the satellite number SV scheduled to be searched for next. If a GPS satellite 15 with an SNR of 40 or more is found after the search resumes and a time out is not detected in ST13, the satellite capture detection process ST15 executes again. Reception ends (ST14) if the process times out after the search resumes without being able to find a GPS satellite 15 with an SNR greater than or equal to 40.

A time-out can also be set in the satellite capture detection process ST15 in the same way as in the satellite search step ST12. For example, operation may time out and control return to the satellite search step ST12 if capturing a satellite signal is not confirmed within 6 seconds after the start of the satellite capture process.

If capturing a satellite signal is confirmed in the satellite capture detection process ST15, the reception controller 51 references the time adjustment recording component 55 to determine if subframe 1 was previously received and the time was adjusted based on the second information contained in subframe 1 (ST41).

More specifically, the reception controller 51 determines based on the content of the time adjustment recording component 55 whether the time was adjusted using the second information contained in subframe 1 in the time adjustment process ST25 described below after the GPS wristwatch 10 power was turned on, that is, after a system reset. The time adjustment recording component 55 therefore records in the time adjustment recording component 55 of the storage unit 20A that the time was adjusted based on the second information if subframe 1 is received in the subframe reception process ST20 and the date and time is adjusted in the time adjustment process ST25.

If the time adjustment recording detection step ST41 that determines if adjustment of the time based on the second information is recorded in the time adjustment recording component 55 determines that the time was adjusted, the control unit 20 activates the first time information adjustment component 53.

The first time information adjustment component 53 controls the GPS device 40 in a first reception mode to receive the Z count (first information) (ST30). The first time information adjustment component 53 then confirms if the Z count (first information) was acquired (ST16).

Before describing the Z count acquisition determination process ST16, the navigation message that is the signal (satellite signal) transmitted from each GPS satellite 15 is described below.

Figure 9:
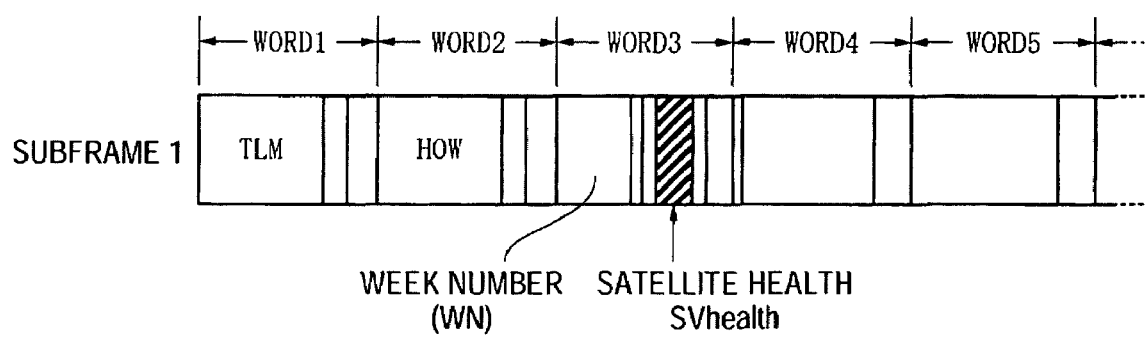
FIG. 9 schematically describes subframe 1 of the GPS signal.

FIG. 7 to FIG. 9 schematically describe the GPS satellite signal.

As shown in FIG. 7, the navigation message contained in the signal from each GPS satellite 15 has a frame data structure (main frame configuration) that is transmitted at 50 bps with the main frame containing a total 1500 bits. One frame is equal to 30 seconds.

The navigation message contains five subframes, subframe 1 to subframe 5, with each subframe containing 300 bits. It takes 6 seconds to transmit one data subframe. The subframe data includes the week number, satellite correction data including the satellite health, the ephemeris (detailed orbital information for the particular GPS satellite 15), and the almanac (approximate orbit information for all GPS satellites 15 in the constellation).

Each subframe is divided into 10 words, each word being 0.6 second long. The first two words in each subframe are the TLM word (word 1) and the HOW word (handover word) (word 2).

As shown in FIG. 8, preamble data is stored at the beginning of the TLM word, one of the first two words at the beginning of each subframe.

The word following the TLM word is the HOW word, which begins with the TOW (Time of Week or Z count), that is, the GPS time of the GPS satellite.

The GPS time is the number of seconds since 00:00:00 Sunday night, and is reset to zero at precisely 00:00:00 every Sunday night. The GPS time is thus information expressing the time since the start of the week in seconds. This GPS time is also called the Z count, and enables the GPS device 40 to know the current time.

The Z count is the time of the next subframe. For example, the Z count in subframe 1 is the time data for subframe 2.

The HOW word stores a 3-bit ID code indicating the subframe ID. More specifically, the ID codes for subframes 1 to 5 labelled (A) to (E) in FIG. 7 are the binary values 001, 010, 011, 100, and 101, respectively, representing the values 1 to 5.

As shown in FIG. 9, the word data in subframe 1 shown in FIG. 7 (A) also includes word 3, which stores the week number (WN) or calendar data and the satellite health SVhealth information. The second information can therefore be received by receiving subframe 1.

The week number identifies the week of the current GPS time. More specifically, the starting point for the GPS time information is 00:00:00 of Jan. 6, 1980 referenced to the Coordinated Universal Time (UTC), and the week that started on this day is week 0. The GPS receiver can therefore get the precise satellite time from the week number and the elapsed time (number of seconds).

The week number is updated once a week.

Therefore, if the receiver gets the week number when the calendar is not set because of a system reset, for example, and then counts the time passed since the week number was acquired, the current week number of the GPS satellite 15 can be known from the acquired week number and the elapsed time without getting the week number data again. As a result, the approximate current GPS time can be known once the Z count data is acquired. Power consumption can therefore normally be reduced because the reception operation of the receiver can be completed in a short time by acquiring only the Z count. More particularly, while the Z count is transmitted every 6 seconds, the week number WN and the satellite health SVhealth use data that is transmitted only once every 30 seconds, and the time can therefore be acquired in a short time by acquiring only the Z count.

As also further described below, if the week number is again acquired from the satellite signal from a GPS satellite 15 when specific conditions are met, the receiver can acquire the current GPS time from the newly received week number and Z count.

Because the signals described above are transmitted from the GPS satellites 15, GPS signal reception as used herein means phase synchronization with the C/A code from the GPS satellite 15.

More specifically, the GPS device 40 that is the receiver must synchronize with the signal from the GPS satellite 15 in order to get the frame data from a particular GPS satellite 15.

The C/A code is used for synchronization with 1 ms precision, and is a 1023-chip pseudo random noise code that repeats every 1 ms. The C/A code (1023 chip (1 ms) code) is different for each of the plural GPS satellites 15, and is unique to a particular satellite.

Therefore, to receive the satellite signal from a particular GPS satellite 15, the GPS device 40 (reception unit) generates the unique C/A code for a particular GPS satellite 15 and phase synchronizes with the C/A code from the selected GPS satellite 15 to receive the satellite signal.

By synchronizing with the C/A code (1023 chips (1 ms)), the preamble of the TLM word and the HOW word of each subframe can be received, and the Z count data can be acquired from the HOW word. After acquiring the TLM word and the Z count (TOW) from the HOW word, the GPS device 40 can then acquire the week number (WN) data and the satellite health SVhealth data.

Whether the acquired Z count data can be trusted can be determined with a parity check. More specifically, the parity data following the TOW data in the HOW word can be used to verify if the received data is correct. If an error is detected from the parity data, there is something wrong with the Z count data and the Z count data is not used to correct the internal clock.

The frame data shown in FIG. 7 is thus an example of information carried in frame units, and the subframe data is an example of information carried in subframe units, and both are examples of a specific unit of the satellite signal. The Z count (TOW) data is an example of satellite time information from a positioning information satellite (GPS satellite 15). The week number (WN) data is an example of week number information, which is the number of weeks from the origin of the satellite time information. The Z count data, week number (WN) data, TLM word, and HOW word are examples of satellite signal information. The satellite health SVhealth data is an example of positioning information satellite health information describing the operating condition of the positioning information satellite.

As described above, the first information in this aspect of the invention is the Z count, and the second information is the Z count, the week number, and the satellite health information.

The navigation message that is the satellite signal transmitted from the GPS satellite 15 is as described above.

Determining acquisition of the Z count in the Z count acquisition determination process ST16 is described next.

The GPS device 40 controlled by the first time information adjustment component 53 gets the Z count or first information that is the GPS time described above from the navigation message, which is the satellite signal transmitted from the GPS satellite 15. The GPS device 40 then outputs the acquired Z count to the control unit 20, and the first time information adjustment component 53 of the control unit 20 stores the Z count as the GPS time in the storage unit 20A.

More specifically, acquiring the Z count data means that the Z count (TOW) data can be acquired after synchronizing with the preamble of the TLM word as described above. Data errors are detected using the parity data following the TOW data in the HOW word.

The first time information adjustment component 53 determines if the received satellite time information that is the acquired Z count (TOW) data can be trusted. More specifically, if an error in the Z count data is detected by the parity check executed by the first time information adjustment component 53, there is some sort of problem with the acquired Z count data and the Z count data is therefore not used to correct the internal clock. As a result, if an error is detected in the Z count data, the GPS wristwatch 10 determines that the Z count data could not be acquired and control returns to the satellite search step ST12.

A time-out can also be set in the Z count acquisition determination step ST16 as in the satellite search step ST12 described above. If the Z count signal cannot be confirmed even though 6 seconds pass after the start of the Z count acquisition process, operation times out and control returns to ST12.

If the decision component 52 of the GPS wristwatch 10 determines in the Z count acquisition determination process ST16 that the Z count or first information was correctly received, control goes to evaluation step ST17. In ST17 the internal time deviation calculation step compares the received Z count, or more specifically the hour, minute, and second data, with the internal time data stored in the storage unit 20A, and determines if the absolute value of the difference is less than or equal to a predetermined threshold value (allowed internal time range).

This threshold value is set to 1 minute, for example, and may be set according to the required precision or reception interval, for example. If the threshold value is reduced, the probability of ST17 returning NO thus rises. By acquiring the second information (subframe 1) and correcting the time data including the year, month, day and hour, minute, second as described below, the precision of the time displayed by the GPS wristwatch 10 is increased. It is therefore possible to adjust how frequently the second information is acquired and adjust the accuracy of the adjusted time by adjusting the threshold value.

As the length of time since the last time the time was adjusted increases, the possibility of an increase in the deviation between the internal time and the satellite time increases. The threshold value may therefore be increased as the time since the last signal reception increases. For example, if the supply voltage of the GPS wristwatch 10 drops and the reception interval increases, the frequency of the process receiving subframe 1, which increases power consumption, can be reduced by setting the threshold value higher.

If the difference between the Z count and the internal time data 202 is less than or equal to the threshold value in the evaluation step ST17, the reception controller 51 ends the reception process (ST18).

The first time information adjustment component 53 then executes the first time information correction step ST19 to adjust the internal time data stored in the internal time data 202 of the storage unit 20A based on the received Z count data.

The first time information adjustment component 53 also determines the UTC (Coordinated Universal Time) by adding the UTC parameter (which is the cumulative leap seconds that is the difference between the GPS time and the UTC, currently −14 seconds) to the satellite time information stored in the internal time data 202, calculates the time equal to the UTC (Coordinated Universal Time) plus the time zone data stored in the time zone data 204, and stores the resulting time in the time data for timepiece display 203.

The time zone data based on the city name set by the user is stored in the time zone data 204, and the time difference to the UTC is adjusted based on the time zone data (ST26). This results in the time in the time zone of the selected city name being stored in the time data for timepiece display 203.

In the time difference adjustment step ST26 the control unit 20 adjusts the time displayed by the hands 13 on the dial 12 of the GPS wristwatch 10 and the time displayed in the display 14 based on the time data for timepiece display 203 adjusted for the time difference.

If the time adjustment recording detection step ST41 returns NO because there is no record that subframe 1 was previously received and the time was set based on the second information, the second time information adjustment component 54 executes the subframe reception process ST20 if in the evaluation step ST17 the deviation between the first information (Z count) and the internal time data is greater than the threshold value.

If the internal time data of the GPS wristwatch 10 is initialized due to a system reset, for example, the time adjustment record is also initialized by the time adjustment recording component 55. This means that ST41 always returns NO and the subframe reception process ST20 is executed the first time the process runs after the internal time data is initialized.

When the subframe reception process ST20 runs because the evaluation step ST17 returns NO, the subframe reception process ST20 synchronizes with the GPS satellite 15 from which the Z count was acquired as determined by the Z count acquisition determination process ST16, receives the subframe, and checks the subframe ID to determine if subframe 1 was received.

When the subframe reception process ST20 runs because the time adjustment recording detection step ST41 returns NO, the subframe reception process ST20 synchronizes with the GPS satellite 15 captured in the satellite capture detection process ST15, receives the subframe, and checks the subframe ID to determine if subframe 1 was received.

If subframe 1 was received, control goes to step ST21. If subframe 1 was not received, the subframe transmitted next is acquired.

Therefore, if ST16 confirms that the Z count was acquired and ST17 then returns NO, the subframe ID and parity are acquired from the same subframe from which the Z count was acquired in ST16, and the subframe ID is checked to determine if subframe 1 was acquired.

The second time information adjustment component 54 then determines if subframe 1 was correctly acquired (ST21). More specifically, the second time information adjustment component 54 confirms if the acquired subframe 1 is correct by way of a parity check, and determines if the correct subframe data was acquired.

If the subframe acquisition evaluation step ST21 determines that subframe 1 was not correctly acquired, the control unit 20 returns to the satellite search step ST12 and the process repeats.

If the subframe acquisition evaluation step ST21 determines that subframe 1 was correctly acquired, the second time information adjustment component 54 confirms if the satellite health status contained in the acquired subframe data is normal (satellite health evaluation process ST22). The satellite health status identifies whether or not the GPS satellite 15 is currently functioning normally, and is a flag that is set to 0 or 1.

If the satellite health evaluation process ST22 returns NO, the satellite changing step ST23 stores the number of the satellite that is not functioning normally and resets the satellite search to a satellite other than the satellite that is not functioning normally. As a result, when control returns to the satellite search step ST12 the search continues by looking for a satellite other than the satellite that is not healthy.

However, if the satellite health evaluation process ST22 returns YES, the second time information adjustment component 54 ends the reception process (ST24).

The second time information adjustment component 54 then executes the time adjustment process ST25 to correct the year, month, day and hour, minute, second of the internal time data stored in the internal time data 202 of the storage unit 20A based on the information (second information) from the received subframe 1, or more specifically based on the year, month, day information represented by the week number WN and the hour, minute, second information represented by the Z count. The second time information adjustment component 54 also records in the time adjustment recording component 55 that the time was adjusted based on the second information.

The control unit 20 then determines the UTC (Coordinated Universal Time) by adding the UTC parameter (which is the cumulative leap seconds that is the difference between the GPS time and the UTC, currently −14 seconds) to the corrected internal time data 202, adjusts the UTC (Coordinated Universal Time) to the time at the current location based on the time zone data 204, and stores the time in the time data for timepiece display 203 (ST26).

The control unit 20 then adjusts the time displayed by the hands 13 on the dial 12 of the GPS wristwatch 10 and the time displayed in the display 14 based on the time data for timepiece display 203.

The second information time adjustment process executed by the second time information adjustment component 54 thus includes the subframe reception process ST20, the subframe acquisition evaluation step ST21, the satellite health evaluation process ST22, the satellite changing step ST23, the reception ending step ST24, the time adjustment process ST25, and the time difference adjustment step ST26.

The GPS wristwatch 10 thus ends the time adjustment process when reception ends in ST14 and when the time difference is corrected in ST26 as shown in FIG. 6.

The effect of this embodiment of the invention is described next.

(1) If the time has not been adjusted based on the second information after a system reset, that is, the first time the satellite signal is received after a system reset, subframe 1 is received in the subframe reception process ST20 and the year, month, day and hour, minute, second of the internal time data are therefore corrected in the time adjustment process ST25.

As a result, the internal clock can be reliably adjusted to the correct time immediately after a system reset when the possibility is high that the internal clock is wrong because reception continues until the year, month, day data denoted by the week number is received in addition to the hour, minute, second data denoted by the Z count, and the internal time data can be adjusted based on the received data.

(2) When receiving the GPS signal to adjust the time, the GPS wristwatch 10 determines if the time was previously set based on the second information, and receives only the Z count (first information) if the time was previously adjusted based on the second information. If the difference between the internal time data and the time based on the received Z count is less than or equal to a predetermined threshold value (allowable internal time range), the hour, minute, second of the internal time data are corrected based on the received Z count.

Subframe 1 is thus only received when the time has not been previously set using the second information (that is, when ST41 returns NO, such as in the first reception process after a system reset), or when the difference between the time indicated by the received Z count and the internal time data is greater than a threshold value (that is, when ST17 returns NO).

Using the accuracy of a quartz timepiece by way of example, the difference between the received time information and the internal time data is usually less than or equal to the threshold value and the likelihood is high that ST17 will return YES. Only the Z count is therefore usually received when adjusting the time, and the internal time data can be set correctly using a short reception process. Power consumption can therefore be reduced during the normal time setting process that executes regularly such as once a day.

Reception performance can also be improved by leaving the GPS wristwatch 10 stationary during GPS signal reception. However, leaving the GPS wristwatch 10 stationary for a long time is not convenient for the user. This embodiment of the invention normally only needs to receive signals for the short time needed to receive the Z count, however, and can therefore shorten the time that the timepiece must remain stationary and thus improve user convenience.

(3) When the difference between the time indicated by the received Z count and the internal time data is greater than the threshold value, that is, the internal time data differs greatly from the satellite time information of the GPS satellite 15, the possibility is high that there is an error in the internal clock. In this situation the year, month, day information may also be wrong in addition to the hour, minute, second data.

In this situation, the second time information adjustment component 54 in this embodiment of the invention receives subframe 1 and acquires the week number, adjusts the internal time data using the year, month, day information based on the week number and the hour, minute, second information based on the Z count, and can therefore correctly set the internal time data. Because subframe 1 is transmitted at 30 second intervals, the reception time is longer than when only the Z count is received, and power consumption increases accordingly. However, this embodiment of the invention executes the subframe reception process ST20 when the evaluation step ST17 determines that the deviation of the hour, minute, second of the internal time data to the hour, minute, second of the Z count is greater than a predetermined threshold value (specifically 1 minute in this embodiment of the invention), or when the time has not been set using the second information. Therefore, compared with when subframe 1 is always received, overall power consumption by the GPS wristwatch 10 can be reduced because subframe 1 is received only when the satellite signal is received for the first time and when the time difference becomes a certain large difference.

The duration time can therefore be increased in a battery-powered GPS wristwatch 10 compared with a conventional timepiece that always receives subframe 1, and user convenience is improved.

(4) Whether the first information is the correct time information can be determined because the evaluation step ST17 determines if the difference between the first information (hour, minute, second data) and the hour, minute, second data of the internal time data is within an allowable internal time range. As a result, the first time information adjustment component 53 can adjust the internal time data to the correct time using the first information.

Whether the GPS satellite 15 from which the satellite signal is being received is functioning normally or not can also be determined because the second time information adjustment component 54 acquires the satellite health information in the subframe reception process ST20. This prevents setting the internal clock to the wrong time as a result of receiving signals from a GPS satellite 15 that is not functioning normally when adjusting the internal time data using the second information. The internal time data adjustment process ST25 can therefore set the internal clock based on accurate time information acquired by receiving a normal signal.

(5) The subframe reception process ST20 can immediately synchronize with a GPS satellite 15 from which signals can be received because the subframe reception process ST20 synchronizes with the GPS satellite 15 from which the Z count was acquired if the Z count acquisition determination process ST16 determines that the Z count was acquired, and synchronizes with the GPS satellite 15 captured in ST15 if the process in ST30 has not executed. The subframe reception process ST20 can therefore receive subframe 1 in less time than if it starts from the beginning of the satellite search, and power consumption can be reduced accordingly.

(6) If the satellite health evaluation process ST22 determines that the satellite health is not normal, the satellite changing step ST23 stores the satellite number of the unhealthy satellite and reconfigures the search in the satellite search step ST12 using satellite numbers other than the stored satellite numbers until the current reception and time adjustment process ends. Unnecessary satellite searches can therefore be eliminated, and a GPS satellite 15 from which signals can be received can be quickly found.

Embodiment 2

A second embodiment of the invention is described next. In this second and further embodiments described below, parts that are substantially identical to parts in other embodiments are identified by the same reference numerals and further description thereof is omitted.

This second embodiment of the invention differs from the first embodiment in that the second embodiment acquires the Z count from two GPS satellites 15, compares the difference between the two Z counts (first information) and compares the difference between the internal time data and the received Z counts with respective threshold values, and controls adjusting the internal time data based on the Z count or adjusting the internal time data after receiving subframe 1.

The configuration of the GPS wristwatch 10, including the configuration of the control unit 20, is thus the same as the first embodiment, and further description thereof is omitted.

Figure 10:
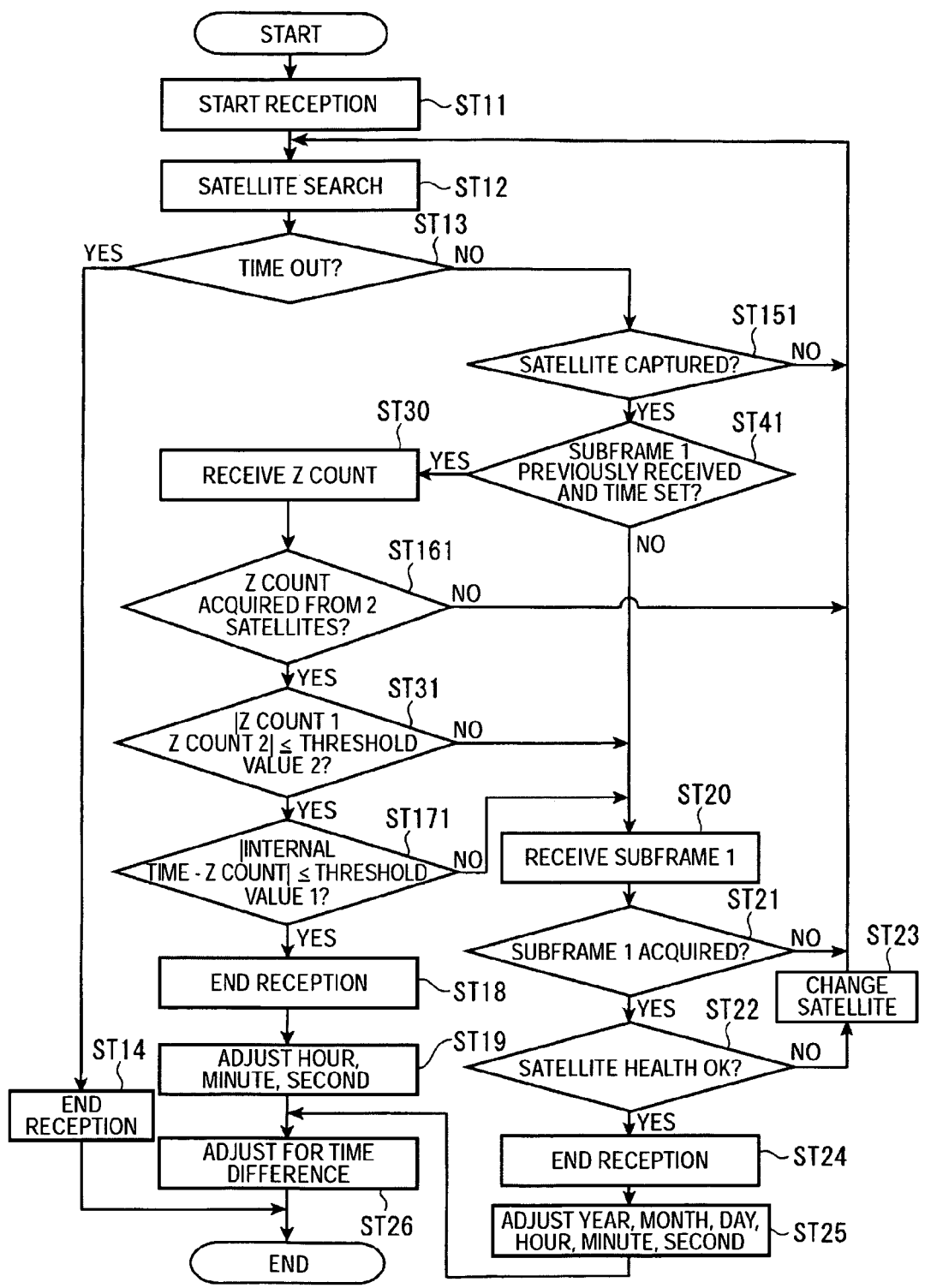
FIG. 10 is a flow chart describing the time adjustment operation of the second embodiment of the invention.

The time adjustment process in this embodiment of the invention is described next with reference to FIG. 10.

In the second embodiment of the invention the reception controller 51 first executes the reception starting step ST11 and then executes the satellite search step ST12 to detect the signal level. The reception controller 51 then determines if synchronization with the GPS satellite 15 signal failed and reception timed out in the time-out detection process ST13. If the time-out detection process ST13 determines that operation timed out, reception is aborted in the reception ending step ST14.

If operation did not time out in the time-out detection process ST13, the reception controller 51 determines in the satellite capture detection process ST151 if two or more GPS satellites 15 were captured.

If two or more GPS satellites 15 were captured, the reception controller 51 references the time adjustment recording component 55 to determine if subframe 1 was previously received and the time was adjusted based on the second information contained in subframe 1 (ST41).

If the time adjustment recording detection step ST41 determines that the time was already adjusted based on the second information, the control unit 20 activates the first time information adjustment component 53.

The first time information adjustment component 53 then controls the GPS device 40 in a first reception mode to receive the Z count (first information) (ST30). The first time information adjustment component 53 then confirms if the Z count (first information) was acquired from two GPS satellites 15 (Z count acquisition determination process ST161).

If the satellite capture detection process ST151 or the Z count acquisition determination process ST161 returns NO, the reception controller 51 returns to the satellite search step ST12 and repeats the process.

If the Z count acquisition determination process ST161 determines that the Z count was received from two GPS satellites 15, the decision component 52 executes a Z count difference evaluation process (satellite information deviation calculation process) ST31 to determine if the difference between the two Z counts is less than or equal to a predetermined second threshold value (allowable satellite time range). More specifically, the decision component 52 acquires the difference between Z count 1 and Z count 2, and determines if the absolute value of this difference is less than or equal to the second threshold value.

This second threshold value is set to 1 second, for example. The Z count (hour, minute, second) in the satellite signals transmitted from the GPS satellites 15 is the same and the difference between the Z counts is usually less than 1 second. Therefore, if the difference between the Z counts is more than 1 second, there is a problem with one of the GPS satellites 15. As a result, when the Z count difference evaluation process ST31 returns NO, the control unit 20 drives the second time information adjustment component 54. The second time information adjustment component 54 then executes the subframe reception process ST20.

However, if the Z count difference evaluation process ST31 returns YES, the decision component 52 runs the evaluation step (internal time deviation calculation step) ST171 to determine if the difference between the internal time data and the Z count is less than or equal to a first threshold value (allowable internal time range). Note that because the difference between the Z counts is small, less than 1 second, the evaluation step ST171 may determine the difference between the internal time data and either one of the Z counts.

If the evaluation step ST171 returns NO, the second time information adjustment component 54 executes the subframe reception process ST20.

However, if the evaluation step ST171 returns YES, the reception controller 51 ends the reception process (ST18).

The first time information adjustment component 53 then executes the first time information correction step ST19 to adjust the internal time data stored in the storage unit 20A based on the received Z count data.

The control unit 20 then adds the UTC parameter (which is the cumulative leap seconds that is the difference between the GPS time and the UTC, currently −14 seconds) to the corrected internal time data 202, adjusts the UTC (Coordinated Universal Time) for the time difference indicated by the time zone data 204 to get the time data for timepiece display 203, and adjusts the time displayed by the hands 13 on the dial 12 of the GPS wristwatch 10 and the time displayed in the display 14 to the time adjusted for the time difference (ST26).

If the time adjustment recording detection step ST41, the Z count difference evaluation process ST31, or the evaluation step ST171 returns NO, the subframe reception process ST20 is run by the second time information adjustment component 54.

As in the first embodiment, the subframe reception process ST20 synchronizes with the GPS satellite 15, checks the subframe ID, and receives subframe 1, which is transmitted every 30 seconds.

As in the first embodiment, the second time information adjustment component 54 then determines if subframe 1 was correctly acquired (ST21).

If the subframe acquisition evaluation step ST21 determines that subframe 1 was not correctly acquired, the control unit 20 returns to the satellite search step ST12 and the process repeats.

If the subframe acquisition evaluation step ST21 determines that subframe 1 was correctly acquired, the second time information adjustment component 54 confirms if the satellite health status contained in the acquired subframe data is normal (satellite health evaluation process ST22).

If the satellite health evaluation process ST22 returns NO, the satellite changing step ST23 that stores the number of the satellite that is not functioning normally and changes the satellite selected for reception is executed. Control then returns to the satellite search step ST12 and searching continues by looking for a satellite other than the satellite that is not healthy.

However, if the satellite health evaluation process ST22 returns YES, the second time information adjustment component 54 ends the reception process (ST24).

The second time information adjustment component 54 then executes the time adjustment process ST25 to correct the year, month, day and hour, minute, second of the internal time data stored in the storage unit 20A based on the second information received from subframe 1, or more specifically based on the year, month, day information represented by the week number WN and the hour, minute, second information represented by the Z count. The second time information adjustment component 54 also records in the time adjustment recording component 55 that the time was adjusted based on the second information.

The control unit 20 then determines the UTC (Coordinated Universal Time) by adding the UTC parameter (which is the cumulative leap seconds that is the difference between the GPS time and the UTC, currently −14 seconds) to the corrected internal time data 202, adjusts the UTC (Coordinated Universal Time) based on the time difference to the time at the current location based on the time zone data 204 to get the time data for timepiece display 203, and adjusts the time displayed by the hands 13 on the dial 12 of the GPS wristwatch 10 and the time displayed in the display 14 to the time-difference corrected time (ST26).

The second information time adjustment process executed by the second time information adjustment component 54 is thus the same as in the first embodiment of the invention.

The GPS wristwatch 10 thus ends the time adjustment process when reception ends in ST14 and when the time difference is corrected in ST26.

In addition to the effects of the first embodiment described above, this embodiment of the invention has the following effect.

The Z count difference evaluation process ST31 in this embodiment of the invention determines the difference between the Z counts (first information) from two satellites, and determines if this difference is less than or equal to a second threshold value (1 second). Therefore, if the difference between the Z counts is less than or equal to the second threshold value, both Z counts are normal and the correct time can be set by adjusting the internal time data using the hour, minute, second data of the Z count in the first time information correction step ST19.

In addition, when the Z count is in error, the Z count error can be reliably detected in the Z count difference evaluation process ST31 and the evaluation step ST171. This causes the subframe reception process ST20 to acquire subframe 1 and step ST22 to confirm the satellite health status, and the internal time data can therefore be corrected based on correct data.

Embodiment 3

A third embodiment of the invention is described next.

The third embodiment differs from the first embodiment in that subframe 1 is received when adjusting the time is manually initiated. The process executed in this third embodiment is described next with reference to FIG. 11 and FIG. 12.

Figure 11:
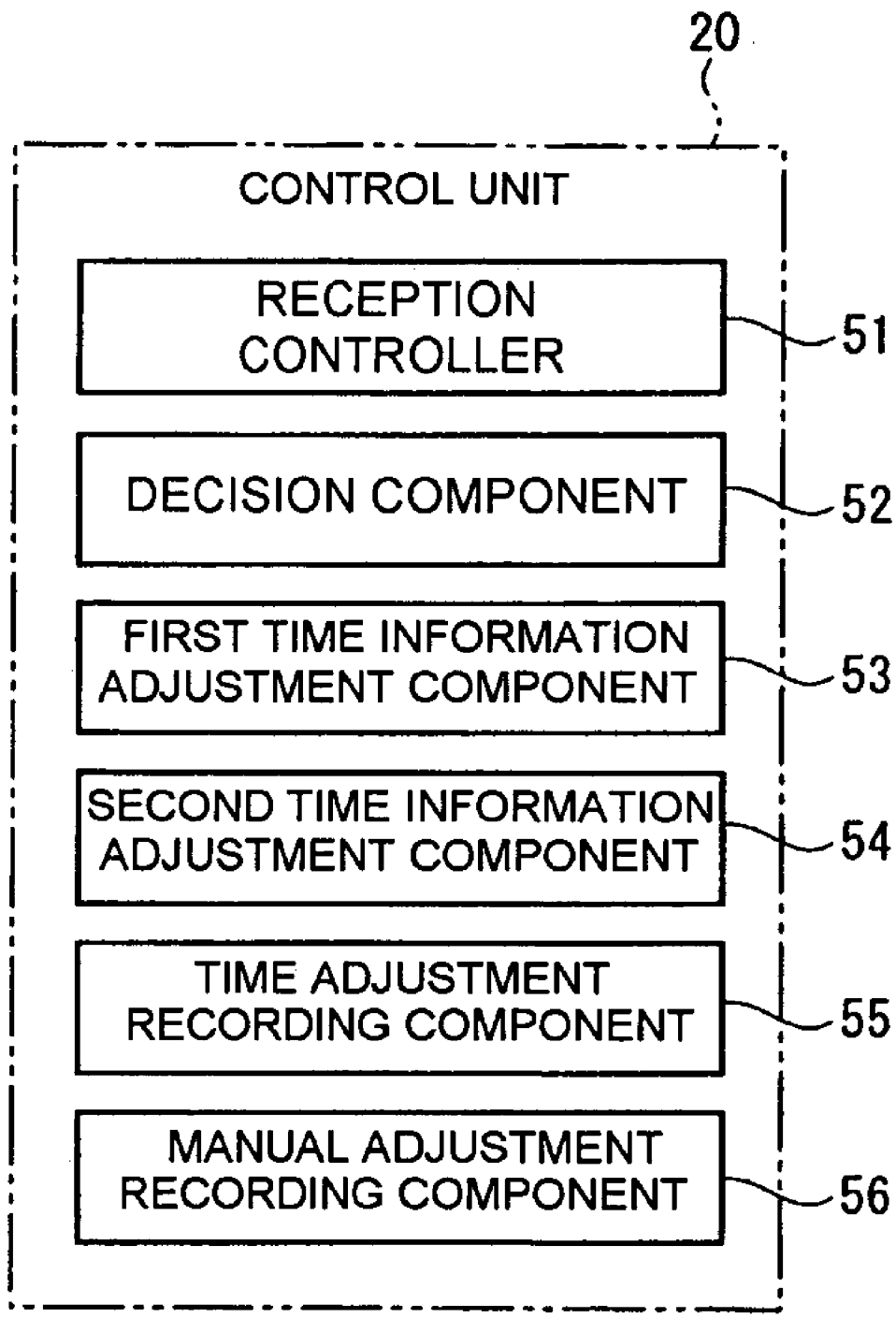
FIG. 11 is a block diagram showing the configuration of the control unit in a third embodiment of the invention.

As shown in FIG. 11, the control unit 20 in this third embodiment has a reception controller 51, a decision component 52, a first time information adjustment component 53, a second time information adjustment component 54, and a time adjustment recording component 55 as in the first embodiment. The control unit 20 in this third embodiment additionally has a manual adjustment recording component 56.

The manual adjustment recording component 56 records if the crown 6 or a button 7 or 8 was operated to manually adjust the internal time data after the last time the satellite signal was received and the internal time data was adjusted.

Figure 12:
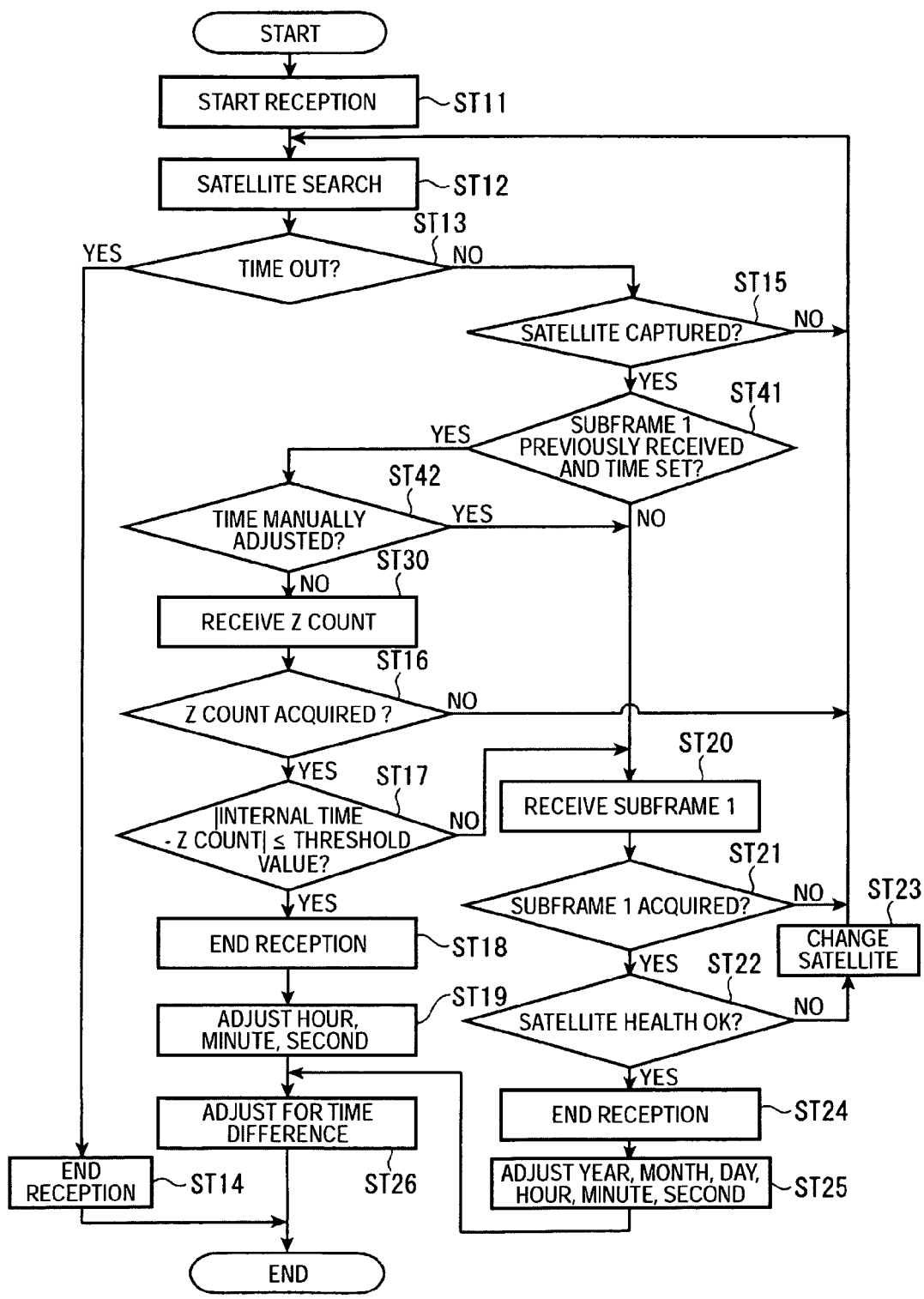
FIG. 12 is a flow chart describing the time adjustment operation of the third embodiment of the invention.

The time adjustment process in this third embodiment of the invention is described next with reference to FIG. 12.

In the third embodiment of the invention the reception controller 51 first executes the reception starting step ST11 and then executes the satellite search step ST12 to detect the signal level. The reception controller 51 then determines if synchronization with the GPS satellite 15 signal failed and reception timed out in the time-out detection process ST13. If the time-out detection process ST13 determines that operation timed out, reception is aborted in the reception ending step ST14.

If operation did not time out in the time-out detection process ST13, the reception controller 51 determines in the satellite capture detection process ST151 if a GPS satellite 15 was captured.

If a GPS satellite 15 was captured, the reception controller 51 references the time adjustment recording component 55 to determine if the time was previously adjusted based on the second information (ST41). More specifically, the reception controller 51 determines based on the record of the time adjustment recording component 55 whether subframe 1 was received in the subframe reception process ST20 and the time was adjusted in the time adjustment process ST25 after the GPS wristwatch 10 power turned on, that is, after a system reset. The time adjustment recording component 55 therefore records that the time was adjusted in the time adjustment process ST25.

If the time adjustment recording detection step ST41 determines that the time was previously adjusted based on the second information, the control unit 20 activates the first time information adjustment component 53.

The first time information adjustment component 53 then references the manual adjustment recording component 56 to determine if the time is being manually adjusted (ST42). More specifically, if the time is manually adjusted after the time has previously been adjusted based on the reception data, the manual adjustment recording component 56 records that the time was manually adjusted in the storage unit 20A.

If step ST42 determines that the time was not manually adjusted, the first time information adjustment component 53 controls the GPS device 40 in a first reception mode to receive the Z count (first information) (ST30). The first time information adjustment component 53 then confirms if the Z count (first information) was acquired (ST16).

If it is determined in ST16 that the Z count was acquired, the decision component 52 runs the evaluation step ST17 to determine if the difference between the internal time data and the Z count is less than or equal to a first threshold value (allowable internal time range).

If ST17 returns YES, the first time information adjustment component 53 executes the reception ending process ST18, the first time information correction step ST19, and the time difference adjustment step ST26, corrects the internal time data 202 based on the received Z count, adds the UTC parameter (which is the cumulative leap seconds that is the difference between the GPS time and the UTC, currently −14 seconds) to convert the corrected internal time data 202 to the desired UTC (Coordinated Universal Time), then adjusts the UTC (Coordinated Universal Time) for the time difference indicated by the time zone data 204 to get the time data for timepiece display 203, and adjusts the time displayed by the hands 13 on the dial 12 of the GPS wristwatch 10 and the time displayed in the display 14 based on this time-difference adjusted time.

If ST16 returns NO, the reception controller 51 returns to the satellite search step ST12.

When ST41 or ST17 returns NO and when ST42 returns YES, the control unit 20 activates the second time information adjustment component 54. The second time information adjustment component 54 then executes the subframe reception process ST20 as in the first embodiment described above.

As in the first embodiment, the second time information adjustment component 54 then determines if subframe 1 was correctly acquired (ST21).

If step ST21 determines that subframe 1 was not correctly acquired, the control unit 20 returns to the satellite search step ST12 and the process repeats.

If step ST21 determines that subframe 1 was correctly acquired, the second time information adjustment component 54 confirms if the satellite health status contained in the acquired subframe data is normal (ST22).

If ST22 returns NO, the satellite changing step ST23 that stores the number of the satellite that is not functioning normally and changes the satellite selected for reception is executed in order to search in the satellite search step ST12 for a satellite other than the satellite determined not healthy. Control then returns to the satellite search step ST12 and searching continues.

However, if process ST22 returns YES, the second time information adjustment component 54 ends the reception process (ST24).

The second time information adjustment component 54 then executes the time adjustment process ST25 to correct the year, month, day and hour, minute, second of the internal time data stored in the storage unit 20A based on the second information received from subframe 1, or more specifically based on the year, month, day information represented by the week number WN and the hour, minute, second information represented by the Z count. The second time information adjustment component 54 also records in the time adjustment recording component 55 that the time was adjusted based on the second information.

The control unit 20 then determines the UTC (Coordinated Universal Time) by adding the UTC parameter (which is the cumulative leap seconds that is the difference between the GPS time and the UTC, currently −14 seconds) to the corrected internal time data, adjusts the UTC (Coordinated Universal Time) based on the time difference to the time at the current location based on the time zone data 204 to get the time data for timepiece display 203, and adjusts the time displayed by the hands 13 on the dial 12 of the GPS wristwatch 10 and the time displayed in the display 14 to the time-difference corrected time (ST26).

The GPS wristwatch 10 thus ends the reception and time adjustment process when reception ends in ST14 and when the time difference is corrected in ST26.

In addition to the effects of the first embodiment described above, this embodiment of the invention has the following effect.

Because a manual adjustment recording component 56 determines if the time has been manually adjusted and subframe 1 is acquired if the time is manually adjusted, the year, month, day and hour, minute, second data can be received and the internal time data can be adjusted even if the internal time data is off due to manual adjustment, and the internal time data can therefore be reliably adjusted to the correct time.

Embodiment 4

A fourth embodiment of the invention is described next.

Figure 13:
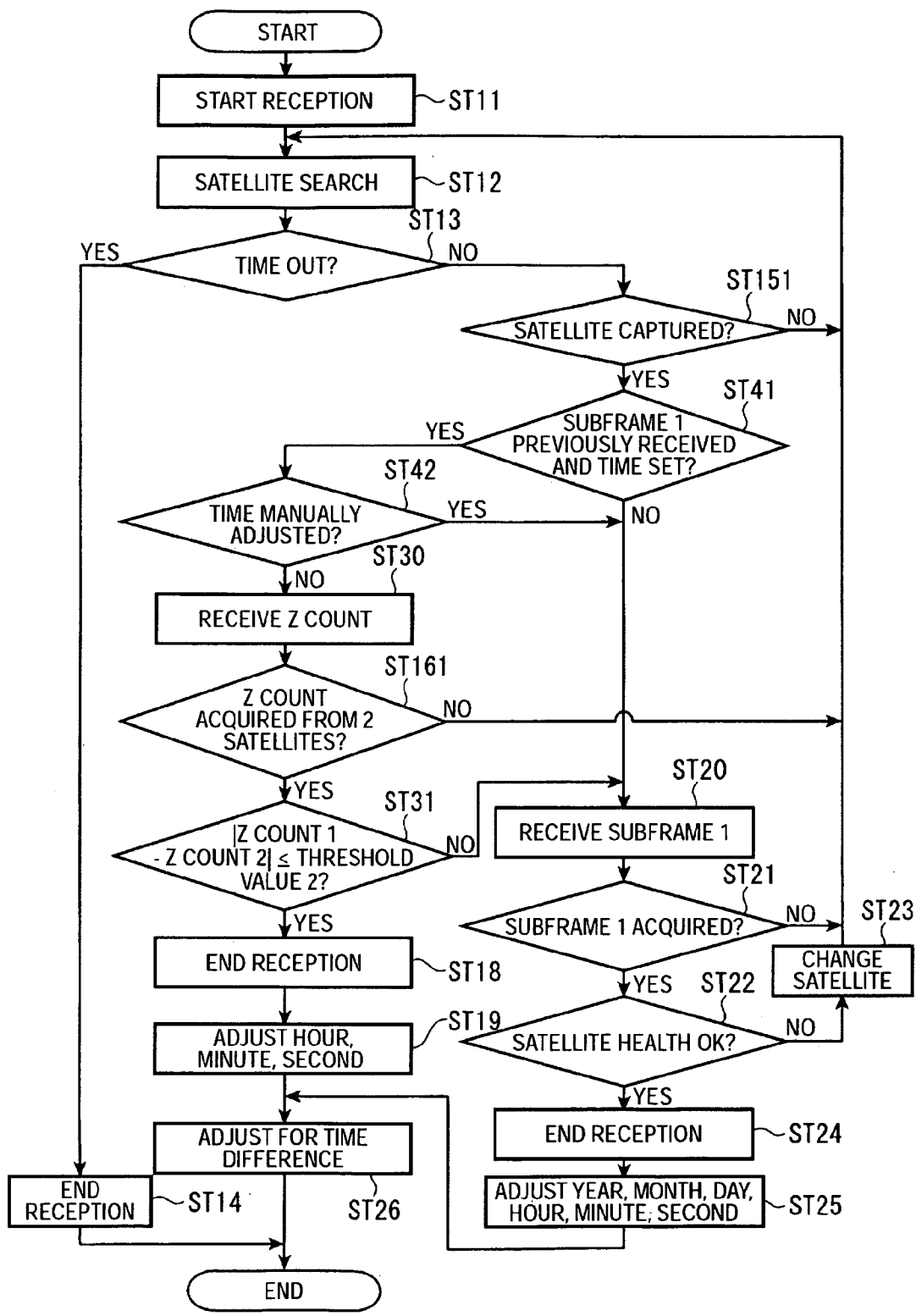
FIG. 13 is a flow chart describing the time adjustment operation of the fourth embodiment of the invention.
Figure 14:
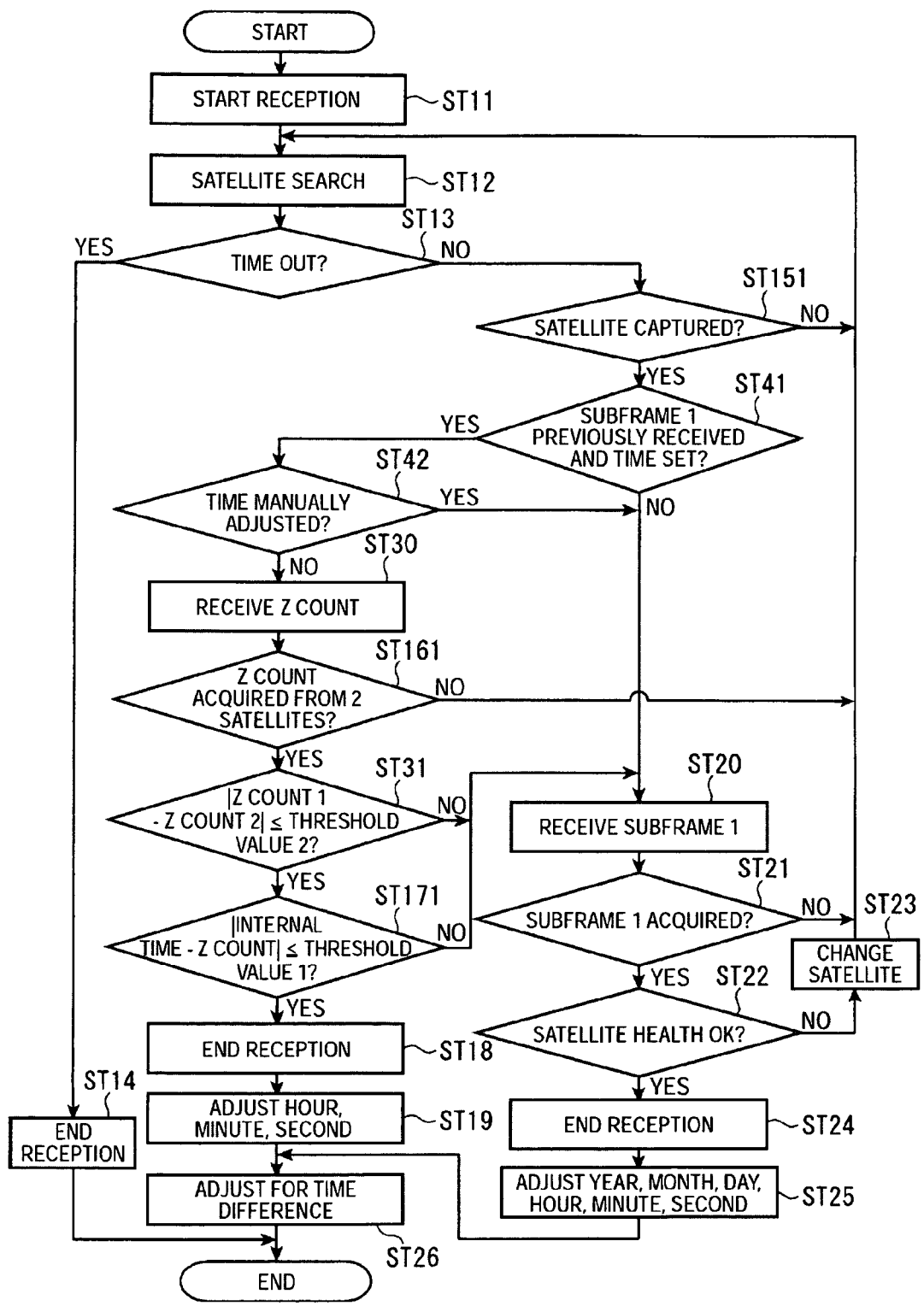
FIG. 14 is a flow chart describing the time adjustment operation of the fifth embodiment of the invention.

The fourth embodiment is basically a combination of the second and third embodiments. The process executed in this fourth embodiment is described next with reference to FIG. 13.

In the fourth embodiment of the invention the reception controller 51 first executes the reception starting step ST11 and then executes the satellite search step ST12 to detect the signal level. The reception controller 51 then determines if synchronization with the GPS satellite 15 signal failed and reception timed out in the time-out detection process ST13. If the time-out detection process ST13 determines that operation timed out, reception is aborted in the reception ending step ST14.

If operation did not time out in the time-out detection process ST13, the reception controller 51 determines in the satellite capture detection process ST151 if a plurality of GPS satellites 15 were captured.

If a plurality of GPS satellites 15 were captured, the reception controller 51 references the time adjustment recording component 55 to determine if subframe 1 was previously received and the time was adjusted based on the second information contained in subframe 1 (ST41).

If step ST41 determines that the time was previously adjusted based on the second information, the control unit 20 activates the first time information adjustment component 53.

The first time information adjustment component 53 then references the manual adjustment recording component 56 to determine if the time is being manually adjusted (ST42).

If step ST42 determines that the time was not manually adjusted, the first time information adjustment component 53 controls the GPS device 40 in a first reception mode to receive the Z count (first information) (ST30). The first time information adjustment component 53 then confirms if the Z count (first information) was acquired from two satellites (ST161).

If the Z count acquisition determination process ST161 determines that the Z count was received from two GPS satellites 15, the decision component 52 executes a Z count difference evaluation process ST31 to determine if the difference between the two Z counts is less than or equal to a predetermined second threshold value (such as 1 second).

If step ST31 returns YES, the first time information adjustment component 53 executes the reception ending process ST18, the first time information correction step ST19, and the time difference adjustment step ST26, corrects the internal time data 202 based on the received Z count, adds the UTC parameter (which is the cumulative leap seconds that is the difference between the GPS time and the UTC, currently −14 seconds) to acquire the UTC (Coordinated Universal Time), then adjusts the UTC (Coordinated Universal Time) for the time difference indicated by the time zone data 204 to get the time data for timepiece display 203, and adjusts the time displayed by the hands 13 on the dial 12 of the GPS wristwatch 10 and the time displayed in the display 14 based on this time-difference adjusted time.

If ST161 returns NO, the reception controller 51 returns to the satellite search step ST12.

When ST41 or ST31 returns NO and when ST42 returns YES, the control unit 20 activates the second time information adjustment component 54. The second time information adjustment component 54 then executes the subframe reception process ST20 as in the first embodiment described above.

As in the first embodiment, the second time information adjustment component 54 then determines if subframe 1 was correctly acquired (ST21).

If step ST21 determines that subframe 1 was not correctly acquired, the control unit 20 returns to the satellite search step ST12 and the process repeats.

If step ST21 determines that subframe 1 was correctly acquired, the second time information adjustment component 54 confirms if the satellite health status contained in the acquired subframe data is normal (ST22).

If ST22 returns NO, the satellite changing step ST23 that stores the number of the satellite that is not functioning normally and changes the satellite selected for reception is executed in order to search in the satellite search step ST12 for a satellite other than the satellite determined not healthy. Control then returns to the satellite search step ST12 and searching continues.

However, if process ST22 returns YES, the second time information adjustment component 54 ends the reception process (ST24).

The second time information adjustment component 54 then executes the time adjustment process ST25 to correct the year, month, day and hour, minute, second of the internal time data stored in the storage unit 20A based on the second information received from subframe 1, or more specifically based on the year, month, day information represented by the week number WN and the hour, minute, second information represented by the Z count. The second time information adjustment component 54 also records in the time adjustment recording component 55 that the time was adjusted based on the second information.

The control unit 20 then determines the UTC (Coordinated Universal Time) by adding the UTC parameter (which is the cumulative leap seconds that is the difference between the GPS time and the UTC, currently −14 seconds) to the corrected internal time data 202, adjusts the UTC (Coordinated Universal Time) based on the time difference to the time at the current location based on the time zone data 204 to get the time data for timepiece display 203, and adjusts the time displayed by the hands 13 on the dial 12 of the GPS wristwatch 10 and the time displayed in the display 14 to the time-difference corrected time (ST26).

The GPS wristwatch 10 thus ends the time adjustment process when reception ends in ST14 and when the time difference is corrected in ST26.

In addition to the effects of the first to third embodiments described above, this embodiment of the invention has the following effect.

When the Z count difference evaluation process ST31 returns YES, the reception ending process ST18 and first time information correction step ST19 are executed directly without executing the evaluation step ST171 as it is in the second embodiment, and processing is therefore faster.

Embodiment 5

A fifth embodiment of the invention is described next.

The fifth embodiment of the invention adds an evaluation step (internal time deviation calculation step) ST171 that determines if the difference between the internal time data and the Z count is less than or equal to a first threshold value (allowable internal time range) to the process executed by the fourth embodiment of the invention.

In the fifth embodiment of the invention the reception controller 51 first executes the reception starting step ST11 and then executes the satellite search step ST12 to detect the signal level. The reception controller 51 then determines if synchronization with the GPS satellite 15 signal failed and reception timed out in the time-out detection process ST13. If the time-out detection process ST13 determines that operation timed out, reception is aborted in the reception ending step ST14.

If operation did not time out in the time-out detection process ST13, the reception controller 51 determines in the satellite capture detection process ST151 if a plurality of GPS satellites 15 were captured.

If a plurality of GPS satellites 15 were captured, the reception controller 51 references the time adjustment recording component 55 to determine if subframe 1 was previously received and the time was adjusted based on the second information contained in subframe 1 (ST41).

If step ST41 determines that the time was previously adjusted based on the second information, the control unit 20 activates the first time information adjustment component 53.

The first time information adjustment component 53 then references the manual adjustment recording component 56 to determine if the time is being manually adjusted (ST42).

If step ST42 determines that the time was not manually adjusted, the first time information adjustment component 53 controls the GPS device 40 in a first reception mode to receive the Z count (first information) (ST30). The first time information adjustment component 53 then confirms if the Z count (first information) was acquired from two satellites (ST161).

If the Z count acquisition determination process ST161 determines that the Z count was received from two GPS satellites 15, the decision component 52 executes a Z count difference evaluation process ST31 to determine if the difference between the two Z counts is less than or equal to a predetermined second threshold value (such as 1 second).

If step ST31 returns YES, the decision component 52 runs the evaluation step (internal time deviation calculation step) ST171 to determine if the difference between the internal time data and the Z count is less than or equal to a first threshold value (allowable internal time range). Note that because the difference between the Z counts is small, less than 1 second, the evaluation step ST171 may determine the difference between the internal time data and either one of the Z counts.

If the evaluation step ST171 returns YES, the first time information adjustment component 53 executes the reception ending process ST18, the first time information correction step ST19, and the time difference adjustment step ST26, corrects the internal time data 202 based on the received Z count, adds the UTC parameter (which is the cumulative leap seconds that is the difference between the GPS time and the UTC, currently −14 seconds) to acquire the UTC (Coordinated Universal Time), then adjusts the UTC (Coordinated Universal Time) for the time difference indicated by the time zone data 204 to get the time data for timepiece display 203, and adjusts the time displayed by the hands 13 on the dial 12 of the GPS wristwatch 10 and the time displayed in the display 14 based on this time-difference adjusted time.

If ST161 returns NO, the reception controller 51 returns to the satellite search step ST12.

When ST41, ST31, or ST171 returns NO and when ST42 returns YES, the control unit 20 activates the second time information adjustment component 54. The second time information adjustment component 54 then executes the subframe reception process ST20 as in the first embodiment described above.

As in the first embodiment, the second time information adjustment component 54 then determines if subframe 1 was correctly acquired (ST21).

If step ST21 determines that subframe 1 was not correctly acquired, the control unit 20 returns to the satellite search step ST12 and the process repeats.

If step ST21 determines that subframe 1 was correctly acquired, the second time information adjustment component 54 confirms if the satellite health status contained in the acquired subframe data is normal (ST22).

If ST22 returns NO, the satellite changing step ST23 that stores the number of the satellite that is not functioning normally and changes the satellite selected for reception is executed in order to search in the satellite search step ST12 for a satellite other than the satellite determined not healthy. Control then returns to the satellite search step ST12 and searching continues.

However, if process ST22 returns YES, the second time information adjustment component 54 ends the reception process (ST24).

The second time information adjustment component 54 then executes the time adjustment process ST25 to correct the year, month, day and hour, minute, second of the internal time data stored in the storage unit 20A based on the second information received from subframe 1, or more specifically based on the year, month, day information represented by the week number WN and the hour, minute, second information represented by the Z count. The second time information adjustment component 54 also records in the time adjustment recording component 55 that the time was adjusted based on the second information.

The control unit 20 then determines the UTC (Coordinated Universal Time) by adding the UTC parameter (which is the cumulative leap seconds that is the difference between the GPS time and the UTC, currently −14 seconds) to the corrected internal time data 202, adjusts the UTC (Coordinated Universal Time) for the time difference to the time at the current location based on the time zone data 204 to get the time data for timepiece display 203, and adjusts the time displayed by the hands 13 on the dial 12 of the GPS wristwatch 10 and the time displayed in the display 14 to the time-difference corrected time (ST26).

The GPS wristwatch 10 thus ends the time adjustment process when reception ends in ST14 and when the time difference is corrected in ST26.

This embodiment of the invention has the same effects as the first to fourth embodiments described above.

Embodiment 6

A sixth embodiment of the invention is described next with reference to FIG. 15.

The embodiments described above execute the same reception process for the automatic reception process and the unconditional reception process. However, this sixth embodiment of the invention changes the content of the reception process executed in the automatic reception process and the unconditional reception process.

The process executed in any of the first to fifth embodiments can be used as the automatic reception process of the sixth embodiment. Further description of the automatic reception process is therefore omitted and the unconditional reception process is described below.

Figure 15:
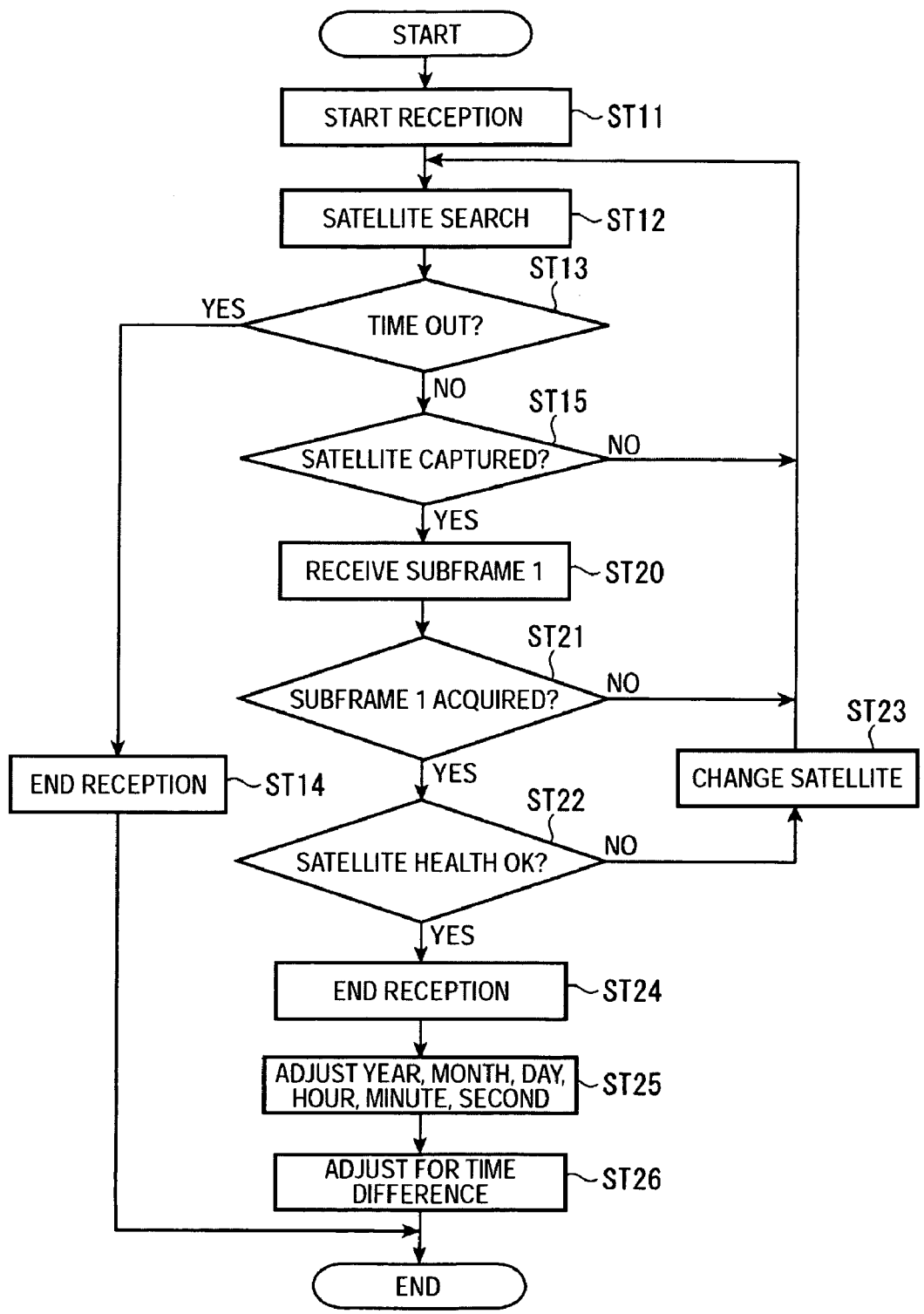
FIG. 15 is a flow chart describing the time adjustment operation of the sixth embodiment of the invention.

When the reception operation is started by pressing a button 7 of the GPS wristwatch 10 continuously for a predetermined time (such as 3 seconds) or more, the control unit 20 controls operation according to the unconditional reception process shown in FIG. 15.

This unconditional reception process always acquires the second information, that is, the year, month, day and hour, minute, second data and the satellite health state, contained in subframe 1.

More particularly, the control unit 20 first executes the reception starting step ST11 and then executes the satellite search step ST12 to detect the signal level. The control unit 20 then determines if synchronization with the GPS satellite 15 signal failed and reception timed out in the time-out detection process ST13. If the time-out detection process ST13 determines that operation timed out, reception is aborted in the reception ending step ST14.

If operation did not time out in the time-out detection process ST13, the control unit 20 determines in the satellite capture detection process ST15 if a GPS satellite 15 was captured.

If a GPS satellite 15 was not captured (ST15 returns No), control goes to the satellite search step ST12 and the process continues.

If a GPS satellite 15 was captured (ST15 returns Yes), the control unit 20 starts the second time information adjustment component 54. The second time information adjustment component 54 then executes the subframe reception process ST20.

In the subframe reception process ST20 the second time information adjustment component 54 synchronizes with the GPS satellite 15 and receives subframe 1, which is transmitted every 30 seconds.

The second time information adjustment component 54 then determines if subframe 1 was correctly acquired (ST21).

If step ST21 determines that subframe 1 was not correctly acquired, control returns to the satellite search step ST12 and the process repeats.

If step ST21 determines that subframe 1 was correctly acquired, the second time information adjustment component 54 confirms if the satellite health status contained in the acquired subframe data is normal (ST22).

If the satellite health evaluation process ST22 returns NO, the satellite changing step ST23 is executed to store the number of the satellite that is not functioning normally and change the satellite selected for reception. Control then returns to the satellite search step ST12 and searching continues for a satellite other than the satellite determined not healthy.

If the satellite health evaluation process ST22 returns YES, the second time information adjustment component 54 ends the reception process (ST24).

The second time information adjustment component 54 then executes the time adjustment process ST25 to correct the year, month, day and hour, minute, second of the internal time data stored in the storage unit 20A based on the second information received from subframe 1, or more specifically based on the year, month, day information represented by the week number WN and the hour, minute, second information represented by the Z count.

The control unit 20 then determines the UTC (Coordinated Universal Time) by adding the UTC parameter (which is the cumulative leap seconds that is the difference between the GPS time and the UTC, currently −14 seconds) to the corrected internal time data 202, adjusts the UTC (Coordinated Universal Time) for the time difference to the time at the current location based on the time zone data 204, and adjusts the time displayed by the hands 13 on the dial 12 of the GPS wristwatch 10 and the time displayed in the display 14 to the time-difference corrected time (ST26).

The GPS wristwatch 10 thus ends the reception and time adjustment process when reception ends in ST14 and when the time difference is corrected in ST26.

This embodiment of the invention always acquires the second information (year, month, day, hour, minute, second) when the reception process is started unconditionally, and can therefore reliably set the time to the correct time including the year, month, and day. The user is therefore assured that the accurate time will always be set if the user starts reception manually.

The invention is not limited to the embodiments described above.

For example, the reception process is executed in the foregoing embodiments when reception starts automatically at a preset time, and when reception is started unconditionally by a user operation. A reception process described in any of the foregoing embodiments may also be executed within a predetermined time after a system reset, such as when the system resets due to the battery being replaced.

The internal time data and the time adjustment recording component 55 are also initialized when the system resets, and the time adjustment recording detection step ST41 therefore always returns NO the first time the process executes. The subframe reception process ST20 and time adjustment process ST25 are therefore always executed in the first reception process after a system reset, and the year, month, day, hour, minute, and second of the internal time data are set. As a result, when a system reset causes the internal time data to be initialized and the internal time data differs from the actual current local time, the time will always be immediately and automatically adjusted to the correct time and user convenience is thus improved.

Note that this predetermined time after which the reception process executes may be set to the time, such as one or two minutes, required to move the GPS wristwatch 10 to a location where GPS satellite signal reception is good, such as near a window, after the system resets.

The evaluation step ST171 executes after the Z count difference evaluation process ST31 in the second embodiment, but processing may continue without the evaluation step ST171 as described in the fourth embodiment. Conversely, the evaluation step ST171 may be executed after the Z count difference evaluation process ST31 in the fourth embodiment.

An elapsed time recording component that records how much time has passed since the last time the time was adjusted may also be provided in the control unit 20 in each of the foregoing embodiments, and the second time information adjustment component 54 may run the second information time adjustment process (the subframe reception process ST20 to the time adjustment process ST25) when the elapsed time reaches this set time (such as 24 hours) regardless of any other conditions.

A power supply detector that detects the power supply voltage may also be disposed to each of the foregoing embodiments, and a low power mode in which operation of the second time information adjustment component 54 is prohibited regardless of any other conditions may be entered when the power supply voltage drops to or below a preset level.

GPS satellites are also used as an example of positioning information satellites in the foregoing embodiments, but the positioning information satellite is not limited to a GPS satellite. More particularly, the invention can be used with other Global Navigation Satellite Systems (GNSS) such as Galileo (EU), GLONASS (Russia), and Beidou (China), and other positioning information satellites that transmit satellite signals containing time information, including the SBAS and other geostationary or quasi-zenith satellites.

A decision component 52 is provided in the foregoing embodiments to adjust the internal time data based on the received first information, but operation may be controlled without using this decision component 52 and evaluation steps ST17 and ST171.

More specifically, whether to adjust the time using the first time information adjustment component 53 or to adjust the time using the second time information adjustment component 54 may be selected based only on whether or not the time has been set in the past based on the second information. If the time was adjusted in the past using the second information, there is almost no possibility that the internal time data in a normally accurate timepiece will deviate from the satellite time to the year, month, or day level. The correct time can therefore be set even if the time is adjusted by receiving only the first information.

The time adjustment recording detection step ST41 is executed after the satellite search step ST12, the time-out detection process ST13, and the satellite capture detection process ST15, ST151 in the foregoing embodiments, but the invention is not so limited. The time adjustment recording detection step ST41 could, for example, be executed first to decide whether to receive the Z count (first information) or subframe 1 (second information). In this situation, the satellite search step ST12, the time-out detection process ST13, and the satellite capture detection process ST15 are executed according to the selection reception process.

VARIATIONS OF THE INVENTION

Other variations of the present invention are described below.

Figure 16:
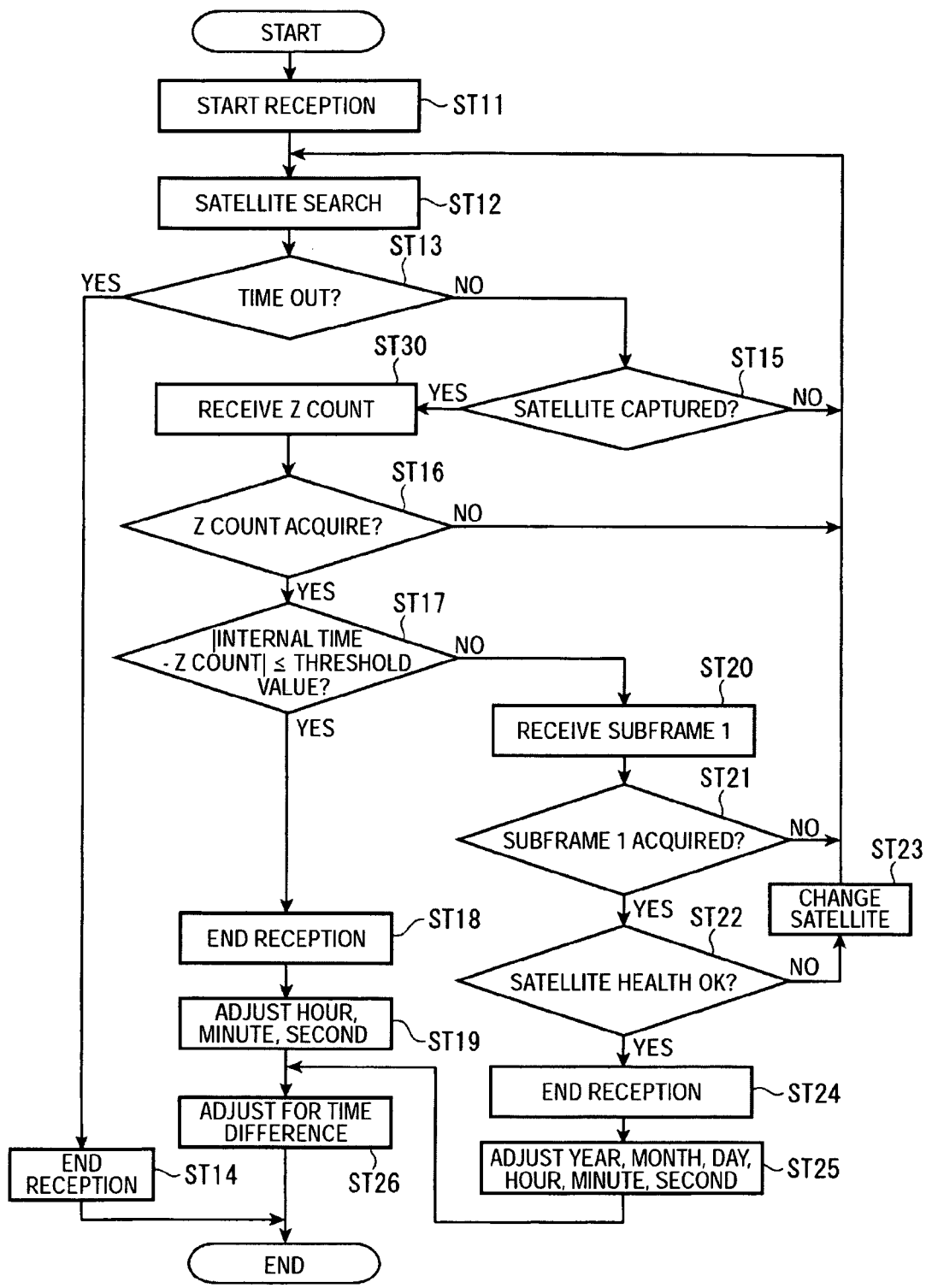
FIG. 16 is a flow chart describing the time adjustment operation of the technology related to the present invention.
Figure 17:
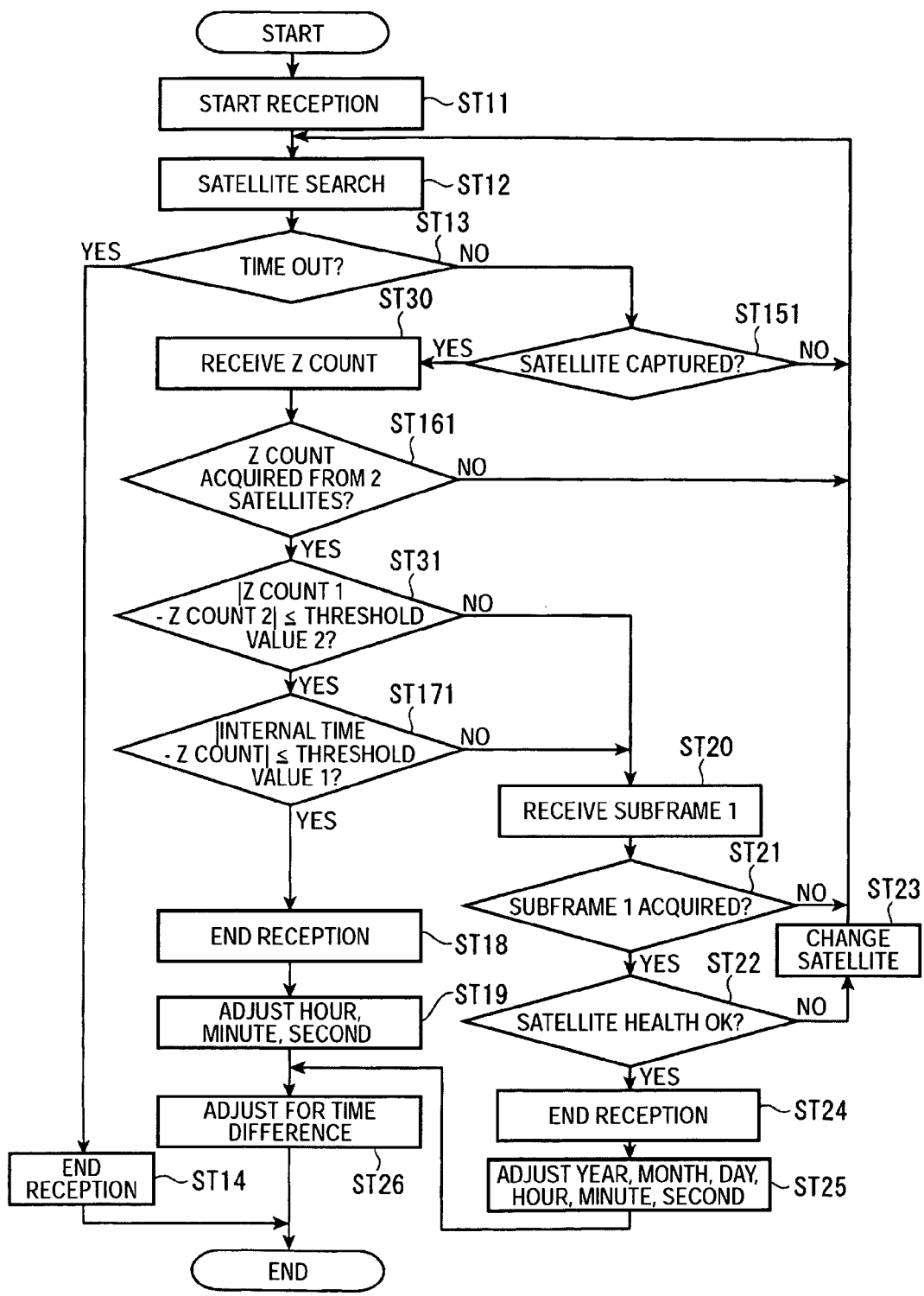
FIG. 17 is a flow chart describing the time adjustment operation of the technology related to the present invention.

As shown in FIG. 16 and FIG. 17, the time adjustment recording detection step ST41 in the foregoing embodiments can be omitted. The process shown in FIG. 16, for example, differs from the process of the first embodiment shown in FIG. 6 only in that the time adjustment recording detection step ST41 is omitted. The process shown in FIG. 17 also differs from the process of the second embodiment shown in FIG. 10 only in that the time adjustment recording detection step ST41 is omitted. Except for the effect of the time adjustment recording detection step ST41, these embodiments have the same operational effect as the other embodiments described above.

More specifically, the time adjustment device according to this aspect of the invention has a reception unit that receives satellite signals transmitted from positioning information satellites, a time information generating unit that generates internal time information, and a time information adjustment component that corrects the internal time information. The satellite signal contains satellite time information that is kept by the positioning information satellite. The reception unit can select a first reception mode for receiving first information including the hour, minute, and second data in the satellite signal, and a second reception mode for receiving second information including the hour, minute, second data, week information for the current date, and satellite health information in the satellite signal. The time information adjustment component includes a first information receiver that controls the reception unit in the first reception mode and receives the first information, a decision component that determines if the internal time can be corrected using the received first information, a first time information adjustment component that sets the hour, minute, second values of the internal time information based on the received first information when it is decided that the internal time can be adjusted using the received first information, and a second time information adjustment component that controls the reception unit in the second reception mode, receives the second information, and sets the year, month, day, hour, minute, second values of the internal time information using the received second information when it is decided that the internal time cannot be adjusted by the first information.

This time adjustment device receives only the first information consisting of the hour, minute, second information, and a decision component determines if the internal time can be corrected using only this first information. The time adjustment process can therefore normally be completed in a short time because the internal time can be corrected by receiving only the first information.

However, when it is determined that the internal time cannot be adjusted using the first information, the second information, which includes the hour, minute, second information, week information for the year, month, day, and satellite health information, is received and the time can therefore be set accurately because the internal time is set based on correct time information including the year, month, and day in addition to the hour, minute, and second.

This time adjustment device can shorten the average reception process time because it is normally sufficient to receive only the first information containing the hour, minute, and second, while the year, month, and day information is acquired in addition to the hour, minute, and second data when the first information alone is not enough to set the correct time.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, it is normally sufficient to receive only the first information and the reception process time can be shortened. As a result, the reception time is short and user convenience is not impaired even when the time adjustment device must remain still during reception.

Furthermore, because the second information includes satellite health information, whether the received second information is correct can be easily determined, and the internal time can be adjusted using correct time information.

In the time adjustment device according to this aspect of the invention the decision component determines that the internal time can be adjusted using the received first information if the difference between the received first information and the internal time data is within a preset allowable internal time range, and determines that the internal time cannot be adjusted using the received first information if this difference is not within the allowable internal time range.

This allowable internal time range may be set referenced to the error that occurs in the internal time data kept by the time information generating unit in the time between when the satellite signal is received once and the next time it is received. For example, if the accuracy of the time information generating unit is comparable to that of a common quartz timepiece, that is, ±15-30 seconds per month, the allowable internal time range may be set to approximately 1 minute to provide sufficient tolerance. The allowable internal time range can thus be set to determine if the internal time substantially matches the received satellite time.

If the received first information is not the correct time, such as when the satellite cannot be currently used or there is an error in the received data, the difference between the received time and the internal time usually exceeds the allowable internal time range (such as 1 minute). The only time that the difference to the internal time will be within the allowable internal time range even though the received first information is not the correct time is when the internal time differs in the same way from the correct time, and the possibility of this happening is extremely small.

Therefore, if the time difference is within the allowable internal time range, it can be assumed that the received first information is the correct time and the internal time is also substantially correct.

As a result, if the difference between the received hour, minute, and second data and the hour, minute, and second data of the internal time is within the allowable range, the internal time can be adjusted to the correct time based only on the received hour, minute, second data (first information).

Furthermore, if the difference between the received hour, minute, and second data and the hour, minute, and second data of the internal time is not within the allowable range, the internal time can be adjusted to the correct time by receiving the second information including year, month, day data in addition to the hour, minute, second data, and adjusting the internal time information based on this second information.

The time adjustment device according to this aspect of the invention thus normally operates in a first reception mode that receives only the hour, minute, and second data, acquires the year, month, day information in addition to the hour, minute, second data only when the difference between the received hour, minute, second data and the internal time data differ greatly and are outside the allowable internal time range, and can thus shorten the average reception process time.

As a result, power consumption can be reduced and the duration time of the power supply can be increased. The duration time of the timepiece can therefore be increased and user convenience can be improved when the time adjustment device of the invention is incorporated in a portable timepiece such as a wristwatch.

Furthermore, it is normally sufficient to receive only the first information and the reception process time can be shortened. As a result, the reception time is short and user convenience is not impaired even when the time adjustment device must remain still during reception.

In a time adjustment device according to another aspect of the invention the first information reception component controls the reception unit in a first reception mode to receive the first information contained in satellite signals transmitted from a plurality of positioning information satellites. The decision component determines that the internal time can be adjusted using the received first information if the difference between the first information received from the plural positioning information satellites is within a preset allowable satellite time range. If the difference between the first information exceeds this allowable satellite time range, the decision component determines that the internal time cannot be adjusted based on the received first information.

The time adjustment device according to this aspect of the invention thus receives the first information including hour, minute, and second data from a plurality of positioning information satellites. The decision component then determines if the difference between the received first information is within a preset allowable satellite time range.

The first information from each positioning information satellite is the same hour, minute, second data, and the received data should match. Therefore, even if the allowable satellite time range is approximately 1 second, the difference between the received first information will normally not exceed the allowable satellite time range (such as 1 second).

As a result, if the difference between the first information is within the allowable satellite time range, the first information received from all of the positioning information satellites is determined to be correct. Any of the received first information can therefore be used to get the correct time. The internal time can also be adjusted to a degree of accuracy that is acceptable for daily use by setting the internal time based on the first information.

However, if the difference between the first information exceeds this allowable satellite time range, there is an error in the received data. In this situation the second information is acquired in the second reception mode, the correct time information can therefore be acquired, and the internal time can be set correctly. Note that because satellite health information is also included in the second information, signals from satellites that cannot currently be used can be easily excluded when a plurality of satellite signals are received, and the internal time can be set to the correct time.

In a time adjustment device according to another aspect of the invention the first information reception component controls the reception unit in a first reception mode to receive the first information contained in satellite signals transmitted from a plurality of positioning information satellites. The decision component determines that the internal time can be adjusted using the received first information if the difference between the first information received from the plural positioning information satellites is within a preset allowable satellite time range and the difference between the received first information and the internal time information is within a preset allowable internal time range. If the difference between the first information exceeds this allowable satellite time range, or the difference between the received first information and the internal time information is not within the allowable internal time range, the decision component determines that the internal time cannot be adjusted based on the received first information.

The time adjustment device according to this aspect of the invention can thus determine if the first information is correct by comparing the first information from a plurality of satellites, and can determine if the internal time deviates to the year, month, or day from the correct time, that is, whether the second information must be used to adjust the time, by comparing the first information with the internal time, and can therefore reliably set the time to the correct time.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A time adjustment device, comprising:
    a reception unit that receives satellite signals transmitted from positioning information satellites;
    a time information generating unit that generates internal time information;
    a time information adjustment component that corrects the internal time information; and
    a reception controller that controls operation of the reception unit;
    wherein a satellite signal contains satellite time information that is kept by the positioning information satellite that transmitted the satellite signal;
    the reception unit can select
        a first reception mode for receiving first information including the hour, minute, and second data in the satellite signal, and
        a second reception mode for receiving second information including the hour, minute, and second data, week information for the current year, month, and day, and satellite health information in the satellite signal;
    the time information adjustment component includes
        a time adjustment recording component that records whether or not the time was adjusted using the second information received in the second reception mode after the internal time information was initialized,
        a first time information adjustment component that controls the reception unit by way of the reception controller in the first reception mode to receive the first information, and sets the hour, minute, and second values of the internal time information based on the received first information, and
        a second time information adjustment component that controls the reception unit in the second reception mode to receive the second information, and sets the year, month, day, hour, minute, and second values of the internal time information using the received second information;
    the first time information adjustment component operates when it is recorded in the time adjustment recording component that the time was adjusted using the second information; and
    the second time information adjustment component operates when it is not recorded in the time adjustment recording component that the time was adjusted using the second information.

2. The time adjustment device described in claim 1, wherein:
    the time information adjustment component has a decision component that determines if the internal time can be adjusted using the first information received in the first reception mode, and
    the time information adjustment component adjusts the internal time using the received first information when the decision component determines that the internal time can be adjusted using the received first information, and operates the second time information adjustment component when the decision component determines that the internal time cannot be adjusted using the received first information.

3. The time adjustment device described in claim 2, wherein:
    the decision component determines that the internal time can be adjusted using the received first information if a difference between the received first information and the internal time data is within a predetermined allowable internal time range, and
    determines that the internal time cannot be adjusted using the received first information if the difference between the received first information and the internal time data is outside the predetermined allowable internal time range.

4. The time adjustment device described in claim 2, wherein:
    the first time information adjustment component controls the reception unit in a first reception mode and receives the first information contained in satellite signals transmitted from a plurality of positioning information satellites; and
    the decision component determines that the internal time can be adjusted using the received first information if the difference between the first information received from the plural positioning information satellites is within a preset allowable satellite time range, and
    determines that the internal time cannot be adjusted based on the received first information if the difference between the first information exceeds this allowable satellite time range.

5. The time adjustment device described in claim 2, wherein:
    the first time information adjustment component controls the reception unit in a first reception mode to receive the first information contained in satellite signals transmitted from a plurality of positioning information satellites;
    the decision component determines that the internal time can be adjusted using the received first information if the difference between the first information received from the plural positioning information satellites is within a preset allowable satellite time range and the difference between the received first information and the internal time information is within a preset allowable internal time range, and
    determines that the internal time cannot be adjusted based on the received first information if the difference between the first information exceeds this allowable satellite time range, or the difference between the received first information and the internal time information is outside the allowable internal time range.

6. The time adjustment device described in claim 1, wherein:
    the time information adjustment component operates the second time information adjustment component, controls the reception unit in the second reception mode, receives the second information, and adjusts the year, month, day, hour, minute, and second of the internal time information based on the received second information within a preset time after the internal time information is initialized.

7. The time adjustment device described in claim 1, further comprising:
    an external operating member that can be operated by a user;

wherein the time information adjustment component can select an automatic reception mode that automatically runs the reception process when the internal time reaches a previously set predetermined time, and an unconditional reception mode that unconditionally runs the reception process when an operation of the external operating member that manually starts reception is detected, and operates the second time information adjustment component, controls the reception unit in the second reception mode, receives the second information, and adjusts the year, month, day, hour, minute, and second of the internal time information according to the received second information when the unconditional reception mode is selected.

8. The time adjustment device described in claim 1, wherein:

the time information adjustment component has an elapsed time recording component that records how much time has passed since the last time the time was adjusted based on the first information or the second information, and operates the second time information adjustment component, controls the reception unit in the second reception mode, receives the second information, and adjusts the year, month, day, hour, minute, and second of the internal time information according to the received second information when the elapsed time is greater than or equal to a set time.

9. The time adjustment device described in claim 1, wherein:

the time information adjustment component has a manual adjustment recording component that records if the time was adjusted manually after the last time the time was adjusted, and operates the second time information adjustment component, controls the reception unit in the second reception mode, receives the second information, and adjusts the year, month, day, hour, minute, and second of the internal time information according to the received second information the first time the time information is received after the time is manually adjusted.

10. The time adjustment device described in claim 1, wherein:

the time information adjustment component has a voltage detector that detects the power supply voltage, and prohibits operation of the second time information adjustment component and always operates the first time information adjustment component when the power supply voltage goes to or below a set voltage.

11. The time adjustment device described in claim 1, wherein:

when the second time information adjustment component controls the reception unit in the second reception mode and receives the second information including the year, month, day, hour, minute, second, and satellite health information in the satellite signal, the second time information adjustment component determines if a flag denoting the satellite signal is usable is set in the satellite health information, and adjusts the year, month, day, hour, minute, second of the internal time information based on the received second information if the flag is set, and receives a satellite signal transmitted from a different positioning information satellite to adjust the internal time information if the flag is not set.

12. A timepiece, comprising:

a time adjustment device as described in claim 1; and a time display unit that displays the internal time information.

13. A time adjustment method, comprising:

a time information generating step that generates internal time information;

an adjustment recording step that records in a time adjustment recording component whether or not the time was adjusted using second information after the internal time information was initialized, the second information including the hour, minute, and second data, week information for the current year, month, and day, and satellite health information contained in a satellite signal received from a positioning information satellite;

a first information time adjustment step that controls a reception unit in a first reception mode to receive first information composed of the hour, minute, second information in the satellite signal, and sets the hour, minute, and second values of the internal time information based on the received first information; and a second information time adjustment step that controls the reception unit in a second reception mode to receive the second information, and sets the year, month, day, hour, minute, and second values of the internal time information using the received second information;

wherein the first information time adjustment step operates when it is recorded in the time adjustment recording component that the time was adjusted using the second information; and the second information time adjustment step operates when it is not recorded in the time adjustment recording component that the time was adjusted using the second information.

* * * * *